(12) United States Patent
Park

(10) Patent No.: US 10,467,018 B2
(45) Date of Patent: Nov. 5, 2019

(54) SYSTEM AND METHOD FOR BOOTING A HOST DEVICE FROM A MOBILE DEVICE

(71) Applicant: SAMSUNG ELECTRONICS CO., LTD., Suwon-si, Gyeonggi-Do (KR)

(72) Inventor: Young-Jin Park, Incheon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 161 days.

(21) Appl. No.: 15/366,759

(22) Filed: Dec. 1, 2016

(65) Prior Publication Data

US 2017/0161083 A1 Jun. 8, 2017

(30) Foreign Application Priority Data

Dec. 2, 2015 (KR) .................. 10-2015-0170489

(51) Int. Cl.
*G06F 9/4401* (2018.01)

(52) U.S. Cl.
CPC .......... *G06F 9/4416* (2013.01); *G06F 9/4406* (2013.01)

(58) Field of Classification Search
CPC .............................. G06F 9/4416; G06F 9/4406
USPC ............... 713/2, 1; 719/318, 319; 455/414.1
See application file for complete search history.

(56) References Cited

U.S. PATENT DOCUMENTS

| 6,754,725 | B1 | 6/2004 | Wright et al. | |
|---|---|---|---|---|
| 7,082,598 | B1 | 7/2006 | Le et al. | |
| 7,562,159 | B2 | 7/2009 | Chen et al. | |
| 7,676,640 | B2 | 3/2010 | Chow et al. | |
| 7,771,215 | B1 | 8/2010 | Ni et al. | |
| 7,788,553 | B2 | 8/2010 | Chow et al. | |
| 8,001,544 | B2 | 8/2011 | Brice, Jr. et al. | |
| 8,296,521 | B2 | 10/2012 | Pyeon | |
| 8,332,846 | B2 | 12/2012 | Astrand | |
| 2005/0038960 | A1* | 2/2005 | Himmel | G06F 9/4406 711/115 |
| 2005/0198484 | A1* | 9/2005 | Cepulis | G06F 9/4416 713/1 |
| 2005/0228980 | A1* | 10/2005 | Brokish | G06F 21/575 713/2 |
| 2005/0268082 | A1 | 12/2005 | Poisner | |
| 2007/0220242 | A1* | 9/2007 | Suzuki | G06F 8/65 713/1 |
| 2011/0197055 | A1* | 8/2011 | Spottswood | G06F 9/4401 713/2 |

(Continued)

*Primary Examiner* — Aurel Prifti
(74) *Attorney, Agent, or Firm* — F. Chau & Associates, LLC

(57) ABSTRACT

A method of booting a host device includes enabling or disabling a ready boot option within a basic input-output system (BIOS) of a host device. A normal boot is performed to load a first operating system (OS), that is stored in an internal storage of the host device, to a main memory of the host device when the ready boot option is disabled. A boot operation to load a second OS, that is stored in an internal storage of a mobile device, to the main memory of the host device is performed when the ready boot option is enabled. An individualized user environment for the host device, is provided by booting the host device from the mobile device. The individualized user environment is easily realized as the user need only connect the mobile device to a designated USB port of the host device prior to restarting the host device.

20 Claims, 19 Drawing Sheets

(56) References Cited

U.S. PATENT DOCUMENTS

| | | | |
|---|---|---|---|
| 2012/0005691 A1* | 1/2012 | Wong | G06F 9/541 |
| | | | 719/319 |
| 2012/0084542 A1* | 4/2012 | Reeves | G06F 13/14 |
| | | | 713/1 |
| 2012/0089992 A1* | 4/2012 | Reeves | G06F 3/1431 |
| | | | 719/318 |
| 2012/0322422 A1* | 12/2012 | Frecks, Jr. | H04L 63/302 |
| | | | 455/414.1 |
| 2013/0042098 A1* | 2/2013 | Baik | G06F 9/4418 |
| | | | 713/2 |
| 2014/0025942 A1* | 1/2014 | Nakazima | G06F 9/4401 |
| | | | 713/2 |
| 2014/0156983 A1* | 6/2014 | Ganesh | G06F 9/441 |
| | | | 713/2 |
| 2014/0215199 A1* | 7/2014 | Ma | G06F 9/4406 |
| | | | 713/2 |
| 2014/0223159 A1* | 8/2014 | Lin | G06F 9/4401 |
| | | | 713/2 |
| 2014/0229727 A1* | 8/2014 | Jun | G06F 9/4418 |
| | | | 713/2 |
| 2014/0281463 A1* | 9/2014 | Even | G06F 9/4406 |
| | | | 713/2 |
| 2014/0372742 A1* | 12/2014 | Hayakawa | G06F 9/441 |
| | | | 713/2 |

* cited by examiner

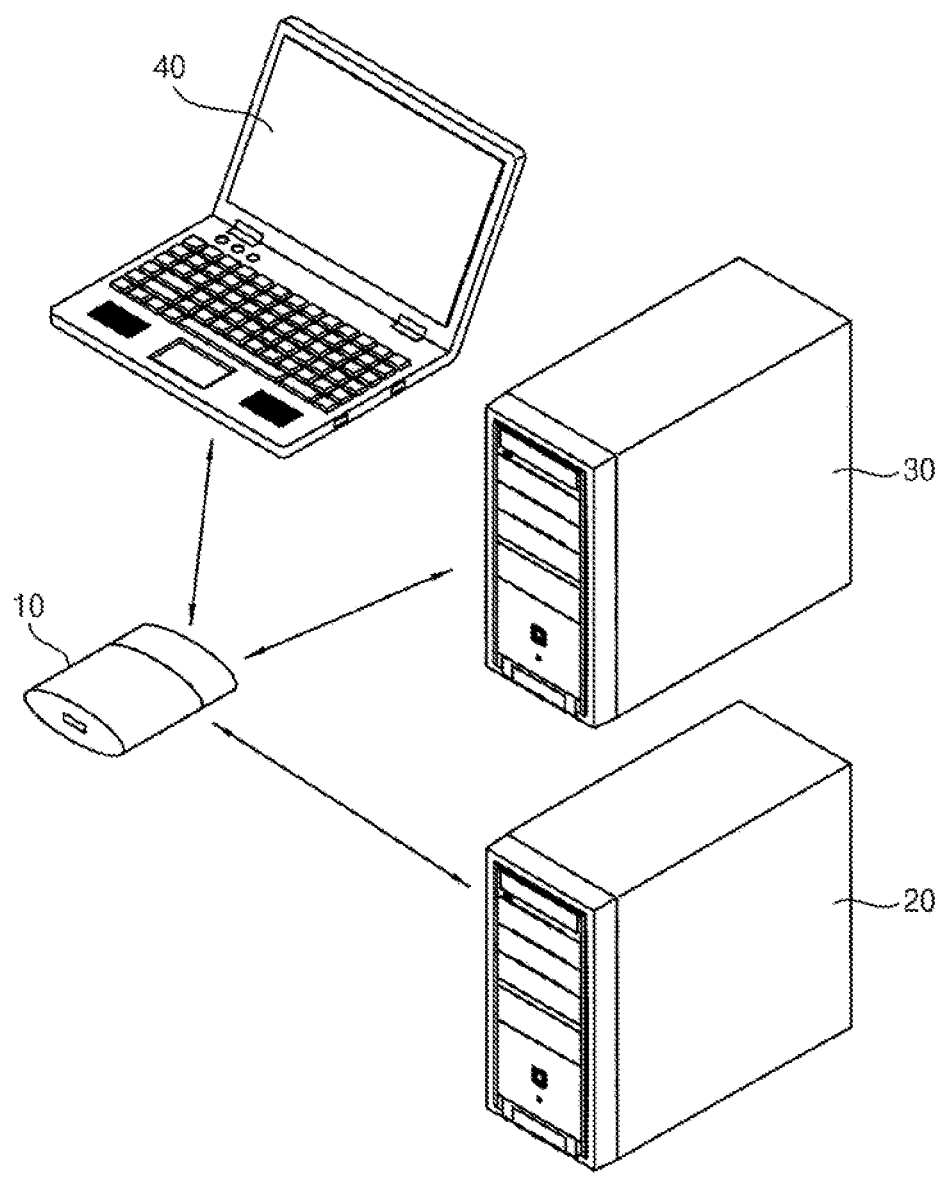

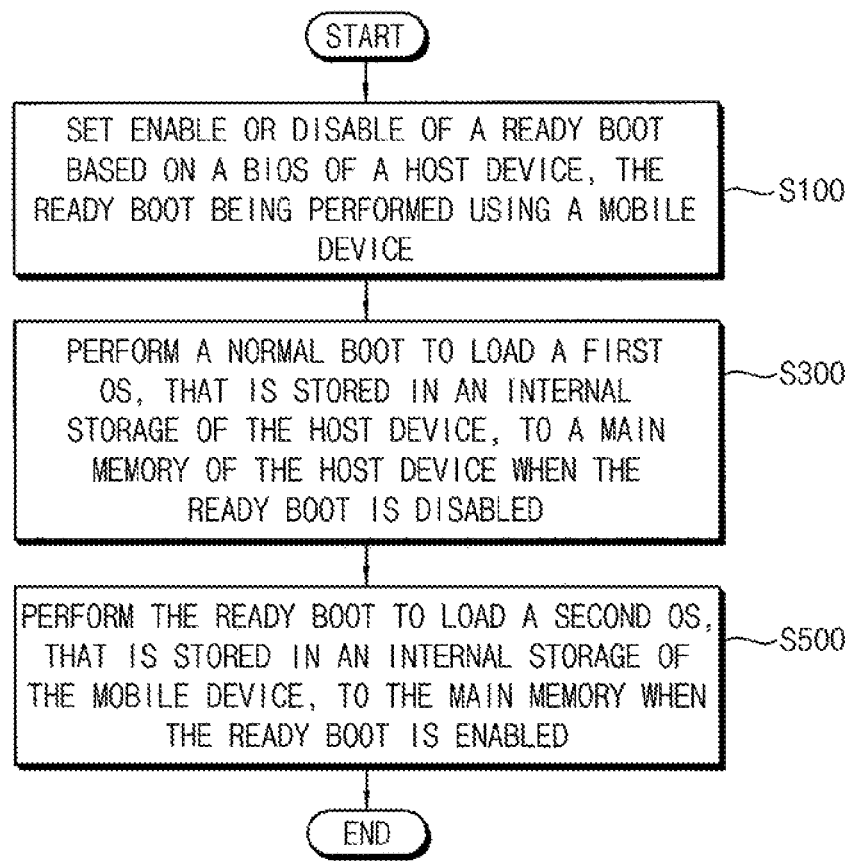

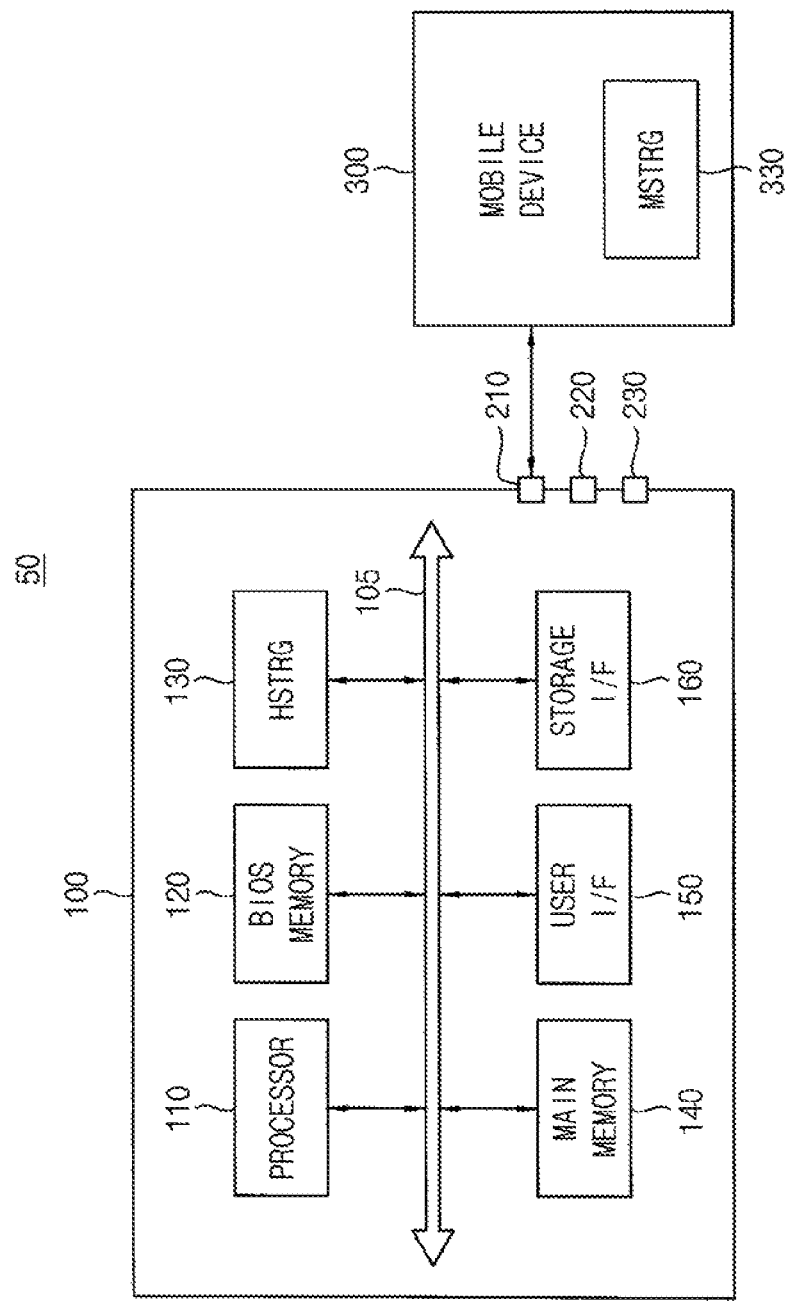

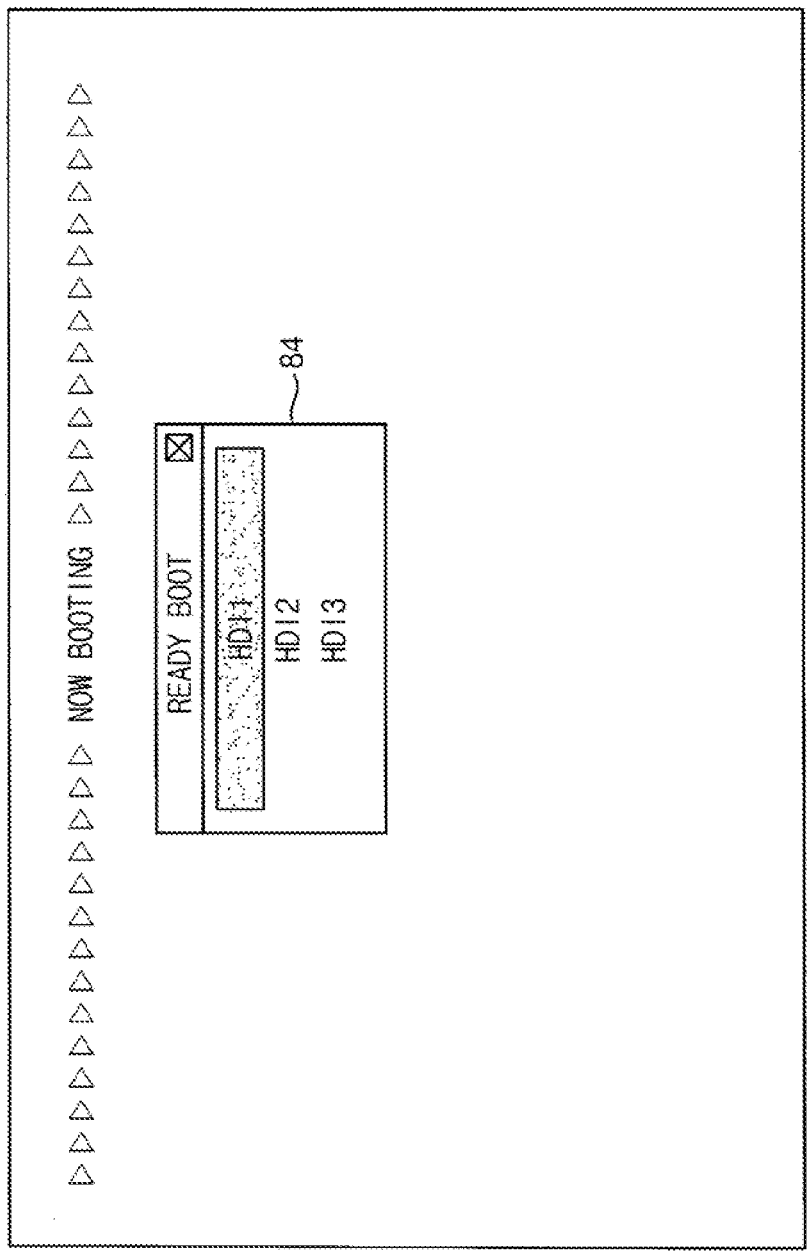

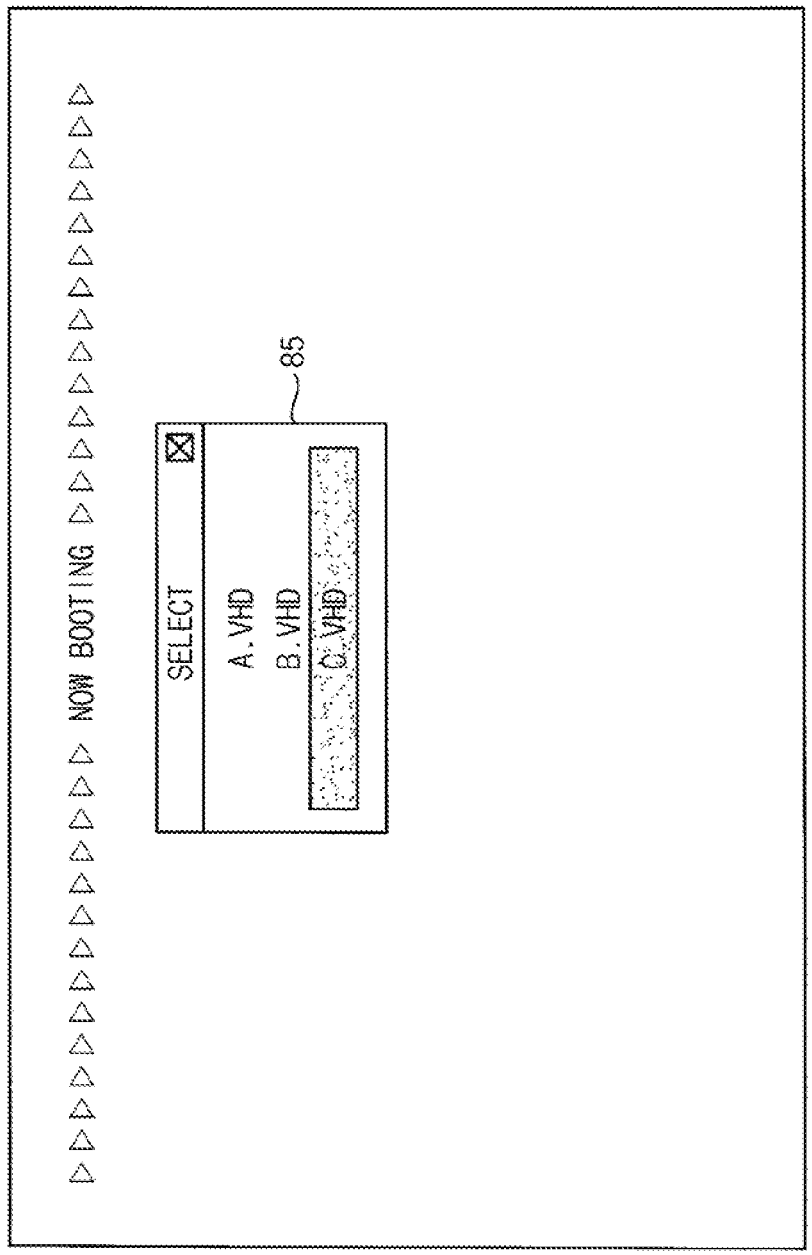

SYSTEM AND METHOD FOR BOOTING A HOST DEVICE FROM A MOBILE DEVICE

CROSS-REFERENCE TO RELATED APPLICATION

This U.S. Non-provisional application claims priority under 35 USC § 119 to Korean Patent Application No. 10-2015-0170489, filed on. Dec. 2, 2015, in the Korean Intellectual Property Office (KIPO), the disclosure of which is incorporated by reference in its entirety herein.

1. TECHNICAL FIELD

Exemplary embodiments relate generally to the booting of electronic host devices, and more particularly to a system and method for booting a host device from a mobile device.

2. DISCUSSION OF THE RELATED ART

In a computer system, such as a personal computer, an operating system (OS) is loaded into a main memory of the computer system when the computer system is powered on so that the computer system may be operated using the loaded operating system. The operating system may be thought of as a collection of individual program files that are executed in cooperation to provide an operational environment for the computer system and to perform some basic functions. Where a user desires that the computer system be booted to a choice of multiple different operating systems, the computer system may be configured for dual or multiple booting such that two or more operating systems are installed within the same computer system and the user is free to select a desired operating system to boot to at the time the computer system is powered on or otherwise reset. However, a computer system configured for dual or multiple booting cannot boot a computer system from an operating system that has been installed on another computer device.

SUMMARY

Some exemplary embodiments of the present disclosure may provide a method of booting a host device using a mobile device.

Some exemplary embodiments of the present disclosure may provide a system of booting a host device using a mobile device.

According to exemplary embodiments of the present invention, a method of booting a host device includes setting enable or disable of a ready boot based on a basic input-output system (BIOS) of a host device. The ready boot is performed using a mobile device. A normal boot operation is performed to load a first operating system (OS) to the host device, that the first operating system is stored in an internal storage of the host device and is loaded into a main memory of the host device when the ready boot is disabled. The ready boot is performed to load a second OS, that is stored in an internal storage of the mobile device, to the main memory of the host device, when the ready boot is enabled.

The enabling or the disabling of the ready boot may be set by a user through a BIOS setup interface menu that is provided by the BIOS.

The method may further include setting a master ready boot port, among a plurality of external connection ports of the host device, to which the mobile device is connected for the ready boot.

The master ready boot port may be set by a user through a BIOS setup interface menu that is provided by the BIOS.

The method may further include generating a flag signal using a detector connected to the master ready boot port, where the flag signal indicates whether the mobile device is connected to the master ready boot port.

The method may further include determining whether to perform the ready boot based on the flag signal.

Performing the ready boot may include loading a boot sector, stored in the internal storage of the mobile device, to the main memory of the host device and loading the second OS, stored in the internal storage of the mobile device, to the main memory of the host device based on the loaded boot sector.

Performing the ready boot may further include loading a user profile information file stored in the internal storage of the mobile device into the main memory of the host device.

Performing the ready boot may further include determining a selected hardware driver information file corresponding to the host device among a plurality of hardware driver information files stored in the internal storage of the mobile device and loading the selected hardware driver information file stored in the internal storage of the mobile device to the main memory of the host device.

The selected hardware driver information file may be determined by a user through an information selection interface that is provided by the second OS.

Performing the ready boot may include selecting a virtual hard disk file that corresponds to the host device, from among a plurality of virtual hard disk files stored in the internal storage of the mobile device. The second OS stored in the internal storage of the mobile device may be loaded into the main memory of the host device based on the BIOS and the selected virtual hard disk file.

The desired virtual hard disk file may be selected by a user through a file selection interface that is provided by the BIOS.

Performing the ready boot may include temporarily loading the first OS stored in the internal storage of the host device to the main memory, determining which virtual hard disk file stored in the internal storage of the mobile device has been selected and loading the second OS stored in the internal storage of the mobile device to the main memory of the host device based on the loaded first OS and the selected virtual hard disk file.

The mobile device may be connected to the host device through a universal serial bus (USB) port of the host device, and the mobile device may include a mobile solid state drive (SSD) device or a mobile communication device such as a smartphone, which may include flash memory storage.

According to an exemplary embodiment of the present invention, a method of booting a host device includes setting a master ready boot port for a ready boot among a plurality of universal serial bus (USB) ports of the host device. The ready boot is enabled or disabled based on a basic input-output system (BIOS) of the host device. It is determined whether a bootable device is connected to the master ready boot. A normal boot operation is performed to load a first operating system (OS), that is stored in an internal storage of the host device, to a main memory of the host device when the ready boot is disabled or when the bootable device is not connected to the master ready boot port. The ready boot is performed to load a second OS, that is stored in an internal storage of the mobile device, to the main memory when the ready boot is enabled and the bootable device is connected to the master ready boot port.

The method and the system of booting the host device according to an exemplary embodiment of the present invention may efficiently provide an individual user environment specific to the user using the mobile device.

The method and the system of booting the host device according to an exemplary embodiment of the present invention may conveniently realize the individual user environment of a user because the user only has to connect the mobile device to the master ready boot port of the host device.

BRIEF DESCRIPTION OF THE DRAWINGS

Exemplary embodiments of the present disclosure will be more clearly understood from the following detailed description taken in conjunction with the accompanying drawings, in which:

FIG. 1 is a diagram illustrating a system for booting a host device from a mobile device according to exemplary embodiments of the present invention;

FIG. 2 is a flow chart illustrating a method of booting a host device according to exemplary embodiments of the present invention;

FIG. 3 is a block diagram illustrating a computer system according to exemplary embodiments of the present invention;

FIG. 8 is a diagram illustrating an information selection interface according to an exemplary embodiment of the present invention;

FIG. 10 is a diagram illustrating a file selection interface according to an exemplary embodiment of the present invention;

DETAILED DESCRIPTION OF THE EMBODIMENTS

Figure 4A:
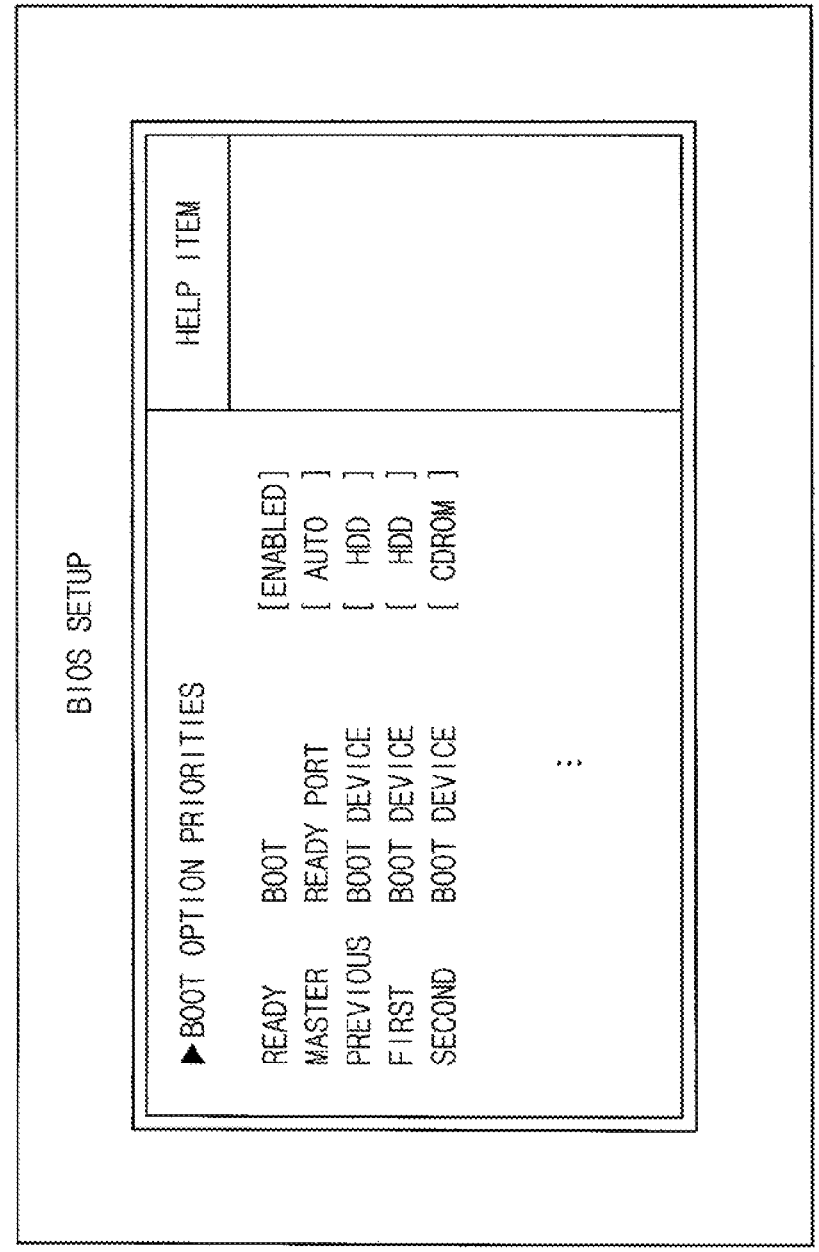
FIGS. 4A, 4B and 4C are diagrams illustrating a basic input-output system (BIOS) setup interface according to an exemplary embodiment of the present invention.

Various exemplary embodiments of the present invention will be described more fully hereinafter with reference to the accompanying drawings. The present disclosure may, however, be embodied in many different forms and should not be construed as limited to the exemplary embodiments set forth herein. Rather, these exemplary embodiments are provided so that this disclosure will be thorough and complete, and will fully convey the scope of the present disclosure to those skilled in the art. In the drawings, the sizes and relative sizes of layers and regions may be exaggerated for clarity. Like numerals may refer to like elements throughout the specification and various drawings.

It will be understood that when an element is referred to as being "connected" or "coupled" to another element, it can be directly connected or coupled to the other element or intervening elements may be present. FIG. 1 is a diagram illustrating a system for booting a host device from a mobile device according to exemplary embodiments of the present invention;

FIG. 1 illustrates operational environments or a system in which the present disclosure may be applied. The system may include a mobile (e.g. portable) device 10 and a plurality of computer devices 20, 30 and 40 to which the mobile device 10 may be connected. In some exemplary embodiments, the computer devices 20, 30 and 40 may include a personal computer such as a desktop computer, a notebook computer, a tablet computer, etc. that are configured for performing general computing tasks. In addition, the computer devices 20, 30 and 40 may include a sever computer that is configured to be accessed by multiple end-users.

In some exemplary embodiments of the present invention, the mobile device 10 may be connected to the computer devices 20, 30 and 40 through universal serial bus (USB) ports of the computer devices 20, 30 and 40, respectively. The USB standard is one of international input-output standards for connecting peripheral devices to a computer device and the USB standard may include various versions of USB 1.0, USB 1.1, USB 2.0, USB 3.0, USB 3.1, etc. A host controller may be disposed in an uppermost level of the USB. The host controller may provide two USB terminals through a root hub. A plurality of ports may be connected to each USB terminal and additional root hub may be connected to provide more ports. The mobile device 10 may be connected to the computer devices 20, 30 and 40 through such USB ports.

However, it is to be understood that exemplary embodiments of the present invention are not limited to the use of USB ports, and other ports may be used such as e-SATA, IEEE 1394, Ethernet, etc.

In some exemplary embodiments, the mobile device 10 may be a mobile solid state drive (SSD) device. In other exemplary embodiments, the mobile device 10 may be a mobile communication device such as a smartphone.

The mobile device 10 may include a nonvolatile storage such as a flash memory. As described below, an operating system OS may be stored in the nonvolatile storage of the mobile device 10 and the computer devices 20, 30 and 40 may be booted from the OS stored in the mobile device 10.

FIG. 2 is a flow chart illustrating a method of booting a host device from a mobile device according to exemplary embodiments of the present invention, and FIG. 3 is a block diagram illustrating a computer system for being booted from a mobile device according to exemplary embodiments of the present invention.

Referring to FIG. 3, a computer system 50 according to exemplary embodiments of the present invention may include a host device 100 and a mobile device 300.

The host device 100 may include a processor 110, a basic input-output system (BIOS) memory 120, an internal storage (host storage) HSTRG 130, a main memory 140 (e.g. RAM), a user interface 150, a storage interface 160 and a bus 105. The host device 100 may be controlled by the processor 110 and the host device 100 may be referred to as a computer device.

The processor 110 may control the overall operations of the host device 100. For example, the processor 110 may be a central processing unit (CPU), an application processor (AP), etc. The processor 110 may be connected to the BIOS memory 120, the internal storage 130, the main memory 140, the user interface 150 and the storage interface 160 through the bus 105. Each of these devices may be accessed by and controlled over the bus 105. The bus 105 may be regarded as including the signal paths for transferring signals between the processor 110, the BIOS memory 120, the internal storage 130, the main memory 140, the user interface 150 and the storage interface 160. For example, the bus 105 may include an address bus, a control bus, a data bus etc.

The BIOS memory 120 may store a BIOS. In a broad sense, the BIOS may be regarded as a program, in the lowest level, for controlling the hardware in response to the instructions of the operating system and various other programs running on the computer system. The BIOS may be a kind of "firmware," having properties halfway between that of hardware and software. The BIOS in the BIOS memory 120 may control fundamental functions of the host device 100 when the host device 100 is powered on. For example, when the host device 100 is powered on, the BIOS in the BIOS memory 120 may be loaded to the main memory 140 and the loaded BIOS in the main memory 140 may be executed by the processor 110 to perform initialization of the host device 100. In addition, various application programs may be stored in the BIOS memory 120. For example, the application programs for supporting storage protocols such as ATA (Advanced Technology Attachment), SCSI (Small Computer System Interface), eMMC (embedded Multi Media Card), UFS (Unix File System), etc. may be stored in the BIOS memory 120. The BIOS memory 120 may include an erasable and programmable read only memory (EEPROM). For example, the BIOS memory 120 include a flash memory.

The internal storage 130 may be a nonvolatile storage device for storing various programs and data. The internal storage 130 may have enough storage to store an operating system OS, multiple application programs, and media/data files. For example, the internal storage 130 may have on the order of hundreds of gigabytes to tens of terabytes of storage capacity. In particular, the internal storage 130 may store at least one OS related to the booting operation of the host device 100. Hereinafter, the OS stored in the internal storage 130 of the host device 100 may be referred to as a first OS. The internal storage 130 may include a nonvolatile storage device such as a hard disk drive (HDD), a solid state disk or solid state drive (SSD), etc.

The main memory 140 may be a memory for storing data and programs. The boot sector, the first OS and application programs stored in the internal storage 130 may be loaded to the main memory 140 for prompt access. For example, the main memory 140 may include a volatile memory device such as a dynamic random access memory (DRAM) and a static random access memory SRAM. In another example, the main memory 140 may include a nonvolatile memory device such as a flash memory, a phase-change random access memory (PRAM), a ferroelectric random access memory (FRAM), a resistive random access memory (RRAM), a magnetic random access memory (MRAM), etc.

The user interface 150 may include physical hardware and/or logical software as physical medium and/or virtual medium for exchanging information between a user and the hardware and the programs of the host device 100. The user interface 150 may include an input device for operating the host device 100 by the user and an output device for representing processed results of the user input.

The storage interface 160 may include physical hardware and/or logical software for connecting an external storage to the host device 100. For example, the storage interface 160 may support storage protocols such an advanced technology attachment (ATA) interface, a serial advanced technology attachment (SATA) interface, a parallel advanced technology attachment (PATA) interface, a universal serial bus (USB) interface or a serial attached small computer system (SAS) interface, a small computer system interface (SCSI), an embedded multi-media card (eMMC) interface, a unix file system (UFS) interface, etc. The external connection ports 210, 220 and 230 illustrated in FIG. 3 may be included in, or otherwise associated with, the storage interface 160.

The mobile device 300 may include an internal storage (mobile device storage) MSTRG 330 for storing data from the host device 100 or proving stored data to the host device 100. In particular, the internal storage 330 may store at least one OS for the booting of the host device 100. Hereinafter, the OS stored in the internal storage 330 of the mobile device 300 may be referred to as a second OS, even though it is to be understood that there may be any number of "second OS" stored within the internal storage 330. The internal storage 330 may retain all of its stored data even when the power of the mobile device is turned off. For example, the internal storage 330 may include a NAND flash memory, a NOR flash memory, a PRAM, an FRAM, an RRAM, an MRAM, etc.

In some exemplary embodiments, the mobile device 300 may be a mobile solid state drive (SSD) device. In other exemplary embodiments, the mobile device 300 may be a mobile communication device such as a smartphone. Also the mobile device may be an arbitrary device for performing various functions other than the mobile SSD device and the mobile communication device.

As used herein, the term, "ready boot" is understood to mean an operation by which a computer system or other host device may be booted from a bootable external storage medium on the command of the BIOS of the computer system/host device, even when the computer system/host device already has an internal bootable storage. Ready boot may be used to boot from an external hard drive/SSD or a non-volatile memory of a mobile device. Ready boot may be used to boot a virtual hard disk image.

Referring to FIGS. 2 and 3, ready boot may be enabled or disabled based on a BIOS of the host device 100, where the ready boot is performed using the mobile device 300 (S100). The enablement and the disablement of the ready boot will be described below with reference to FIGS. 4A, 4B and 4C.

When the ready boot is disabled, a normal boot operation is performed to load a first operating system OSh, that is stored in the internal storage 130 of the host device 100, to the main memory 140 of the host device 100 (S300). When the ready boot is enabled, the ready boot is performed to load a second operating system OSm, that is stored in the internal storage 330 of the mobile device 300, to the main memory 140 of the host device 100. The performance of the normal boot operation and the ready boot will be described below with reference to FIGS. 6A through 11C.

When the host device 100 is switched on, power is provided to the hardware such as the processor 110, the BIOS memory 120, the internal storage 130, the main memory 140, etc. and power-on self-test (POST) may be performed by the BIOS. After the power-on self-test is completed, the BIOS may scan a predetermined list of nonvolatile storage devices. For example, the BIOS may look for a suitable boot device in various locations, according to a boot device sequence, until a bootable device is found. The BIOS determines where the bootable device is located and loads a boot sector from the determined bootable device to the main memory 140. The boot sector stored in a hard disk drive may be referred to as a master boot recorder (MBR).

The boot sector may include information how partitions are organized in the storage medium of the bootable device. In addition, the boot sector may include an executable code, which is referred to as a boot loader, for loading the operating system. The operating system may be loaded form the bootable device to the main memory 140 by the boot loader. After system configuration files are loaded to the main memory 140 by the loaded operating system, the operating system executes initial instructions and then waits for an instruction from the user.

Figure 4B:
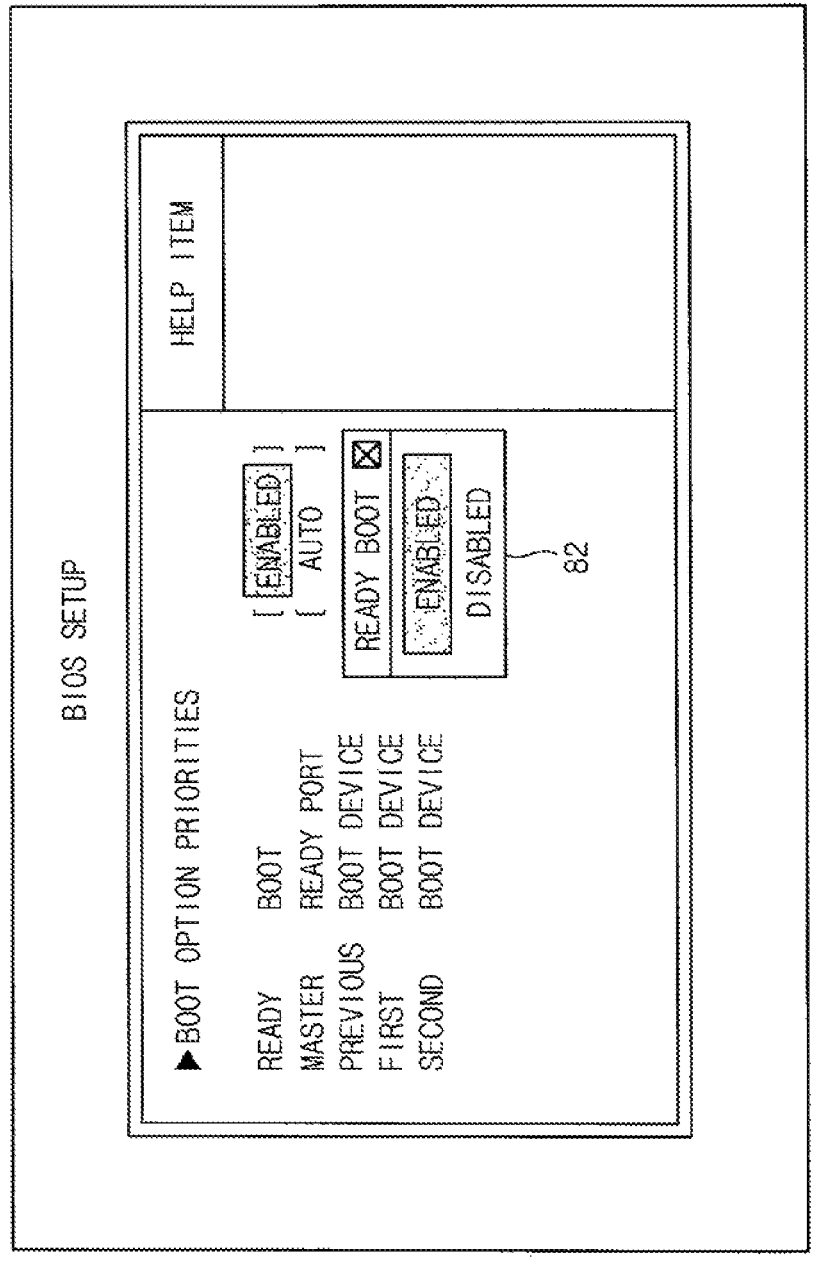
Figure 4C:
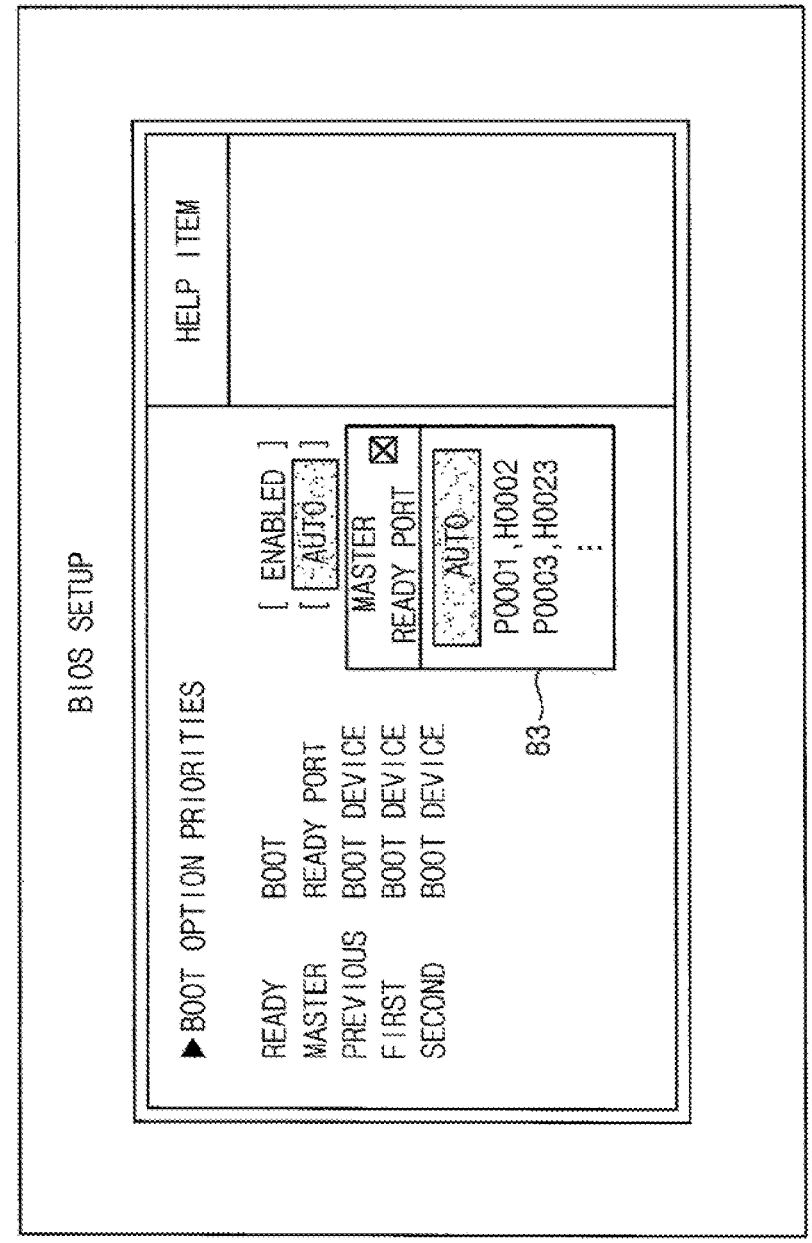

FIGS. 4A, 4B and 4C are diagrams illustrating a basic input-output system (BIOS) setup interface according to an exemplary embodiment of the present invention.

FIG. 4A illustrates an example of a BIOS setup interface menu that is provided by the BIOS. For example, a user interface menu 61 as illustrated in FIG. 4A may be provided by pressing a power button or a reset button of the computer device or pressing a particular key such as "delete" key on a keyboard within a predetermined time after the user inputted a reboot instruction.

Referring to 4A, various options may be set by the user through the user interface menu 61 as illustrated. For example, enabling the ready boot, designating a master ready boot port for the ready boot, designating the first boot device, designating the second boot device, etc. may be performed by the user. The BIOS may monitor and determine the most recent boot device that was used for booting of the computer device.

FIG. 4B illustrates an example of a user interface menu 62 for enabling or disabling the ready boot. When the user selects the option "ready boot", a ready boot option window 82 may pop up and the user may select to enable or disable ready boot through the ready boot option window 82. According to the user selection, a storage value of a portion of the BIOS memory 120 corresponding to the above-mentioned boot device sequence may be programmed.

FIG. 4C illustrates an example of a user interface menu 63 for setting the master ready boot port. The master ready boot port indicates the port to which the mobile device 100 is connected. The host device 100 may have multiple available external connection ports to choose from. When the user selects the item of "master ready port", a mater ready boot port option window 83 may pop up and the user may select the master ready boot port through the master ready boot port option window 83. In FIG. 4C, P0001 and P0003 may represent port numbers and H0002 and H00023 may represent the hub numbers. According to the user selection, a storage value of a portion of the BIOS memory 120 corresponding to the master ready boot port information may be programmed.

If the user selects the item of "auto", the BIOS may determine which port(s) are to be the master ready boot port, according to the hardware configuration of the host device. The BIOS may determine that the read boot is available only if the mobile device 300 is connected to the master ready boot port. For example, the BIOS may determine that the ready boot is not available even when the mobile device 300 is connected to the host device through a port other than the master ready boot port.

Figure 5:
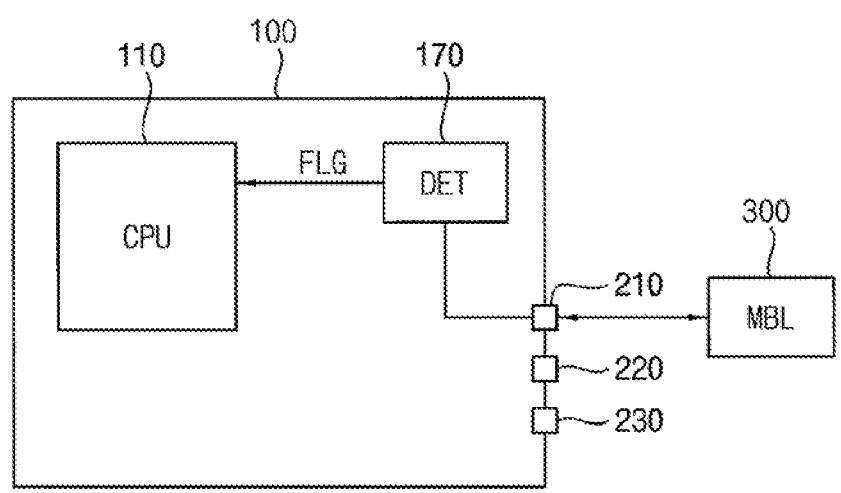
FIG. 5 is a block diagram illustrating a computer system for being booted up by a mobile device according to an exemplary embodiment of the present invention.

FIG. 5 is a block diagram illustrating a computer system for being booted up by a mobile device according to an exemplary embodiment of the present invention.

Referring to FIG. 5, a computer system 51 may include a host device 100 and a mobile device 300. As described with reference to FIG. 3, the host device 100 may include a processor 110, a BIOS memory 120, an internal storage 130, a main memory 140, a user interface 150, a storage interface 160 and a bus 105. For convenience of illustration the BIOS memory 120, the internal storage 130, the main memory 140, the user interface 150, the storage interface 160 and the bus 105 are omitted in FIG. 5 and it is to be understood that these devices share the same description as that of the corresponding devices described in detail above.

In comparison with the computer system 50 described above, the host device 100 in the computer system 51 of FIG. 5 further includes a detector DET 170 connected to a master ready boot port 210 among a plurality of external connection ports 210, 220 and 230 of the host device 100. The detector 170 may generate a flag signal FLG indicating whether the mobile device 300 is connected to the master ready boot port 210. For example, the detector 170 may monitor a voltage or a current at the master ready boot port 210 to determine whether the mobile device 300 is connected to the master ready boot port 210. The detector 170 may activate the flag signal FLG to a first logic level (e.g. 1) or deactivate the flag signal. FLG to a second logic level (e.g. 0) based on the results of the monitoring.

The flag signal FLG may be provided to the processor 110 and a value corresponding to the logic level of the flag signal FLG may be stored in a register of the processor 110. While the processor 110 performs booting based on the BIOS, the processor 110 may determine whether to perform the ready boot based on the flag signal FLG or the stored value corresponding to the logic level of the flag signal FLG.

Figure 6A:
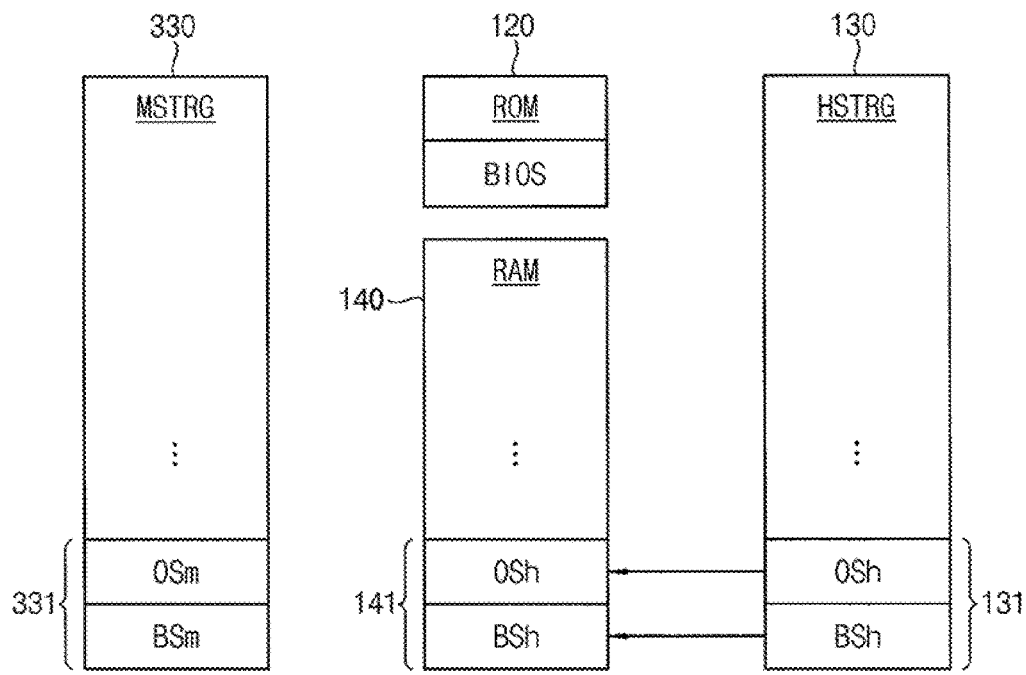
FIGS. 6A and 6B are diagrams illustrating a method of booting a host device from a mobile device according to an exemplary embodiment of the present invention.
Figure 6B:
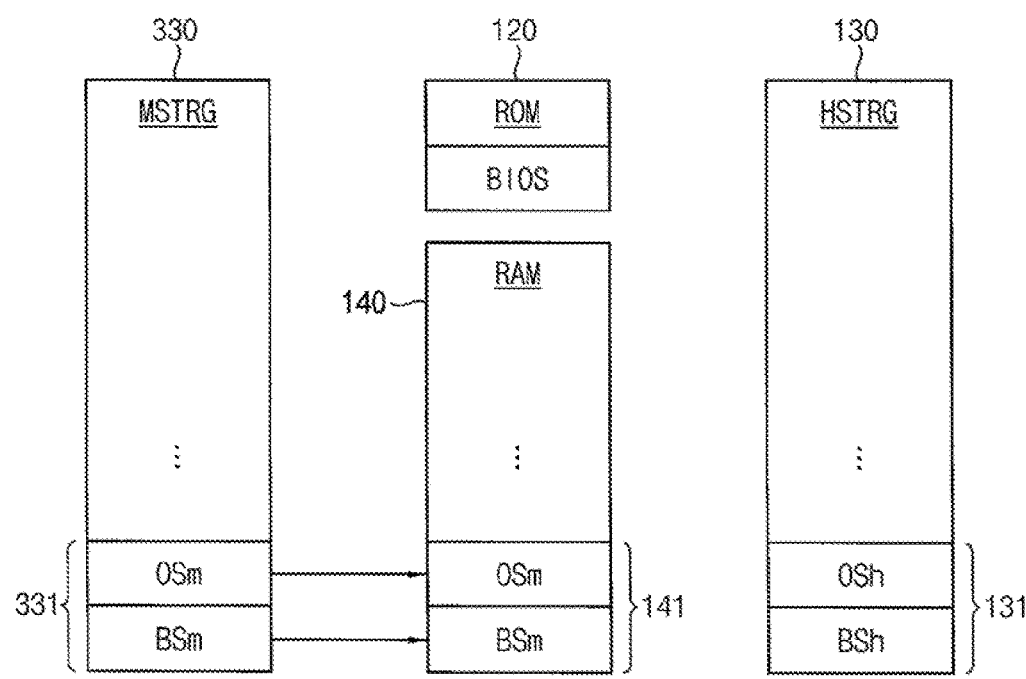

FIGS. 6A and 6B are diagrams illustrating a method of booting a host device from a mobile device according to an exemplary embodiment of the present invention.

Storage spaces of the BIOS memory ROM 120, the internal storage HSTRG 130 of the host device 100, the main memory RAM 140 and the internal storage MSTRG 330 of the mobile device 300 are illustrated in FIGS. 6A and 6B. FIG. 6A illustrates the normal boot operation when the ready boot is disabled by the above-mentioned BIOS setup, and FIG. 6B illustrates the ready boot when the ready boot is enabled in the BIOS. As illustrated in FIGS. 6A and 6B, a first boot sector BSh and a first operating system OSh may be stored in a first region 131 of the internal storage 130 of the host device 100. A second boot sector BSm and a second operating system OSm may be stored in a first region 331 of the internal storage 330 of the mobile device 300.

Referring to FIG. 6A, the BIOS stored in the BIOS memory 120 may load the first boot sector BSh stored in the internal storage 130 of the host device 100 to a first region 141 of the main memory 140. The processor 100 may load the first operating system OSh stored in the internal storage 130 of the host device 100 to the first region 141 of the main memory 140 based on the loaded first boot sector BSh. As such, the normal boot operation may be performed such that the first operating system OSh stored in the internal storage 130 of the host device 100 may be loaded to the main memory 140 of the host device 100.

Referring to FIG. 6B, the BIOS stored in the BIOS memory 120 may load the second boot sector BSm stored in the internal storage 330 of the mobile device 300 to the first region. 141 of the main memory 140. The processor 100 may load the second operating system OSm stored in the internal storage 330 of the mobile device 300 to the first region 141 of the main memory 140 based on the loaded second boot sector BSm. As such, the ready boot may be performed such that the second operating system OSm stored in the internal storage 330 of the mobile device 300 may be loaded to the main memory 140 of the host device 100.

Figure 7A:
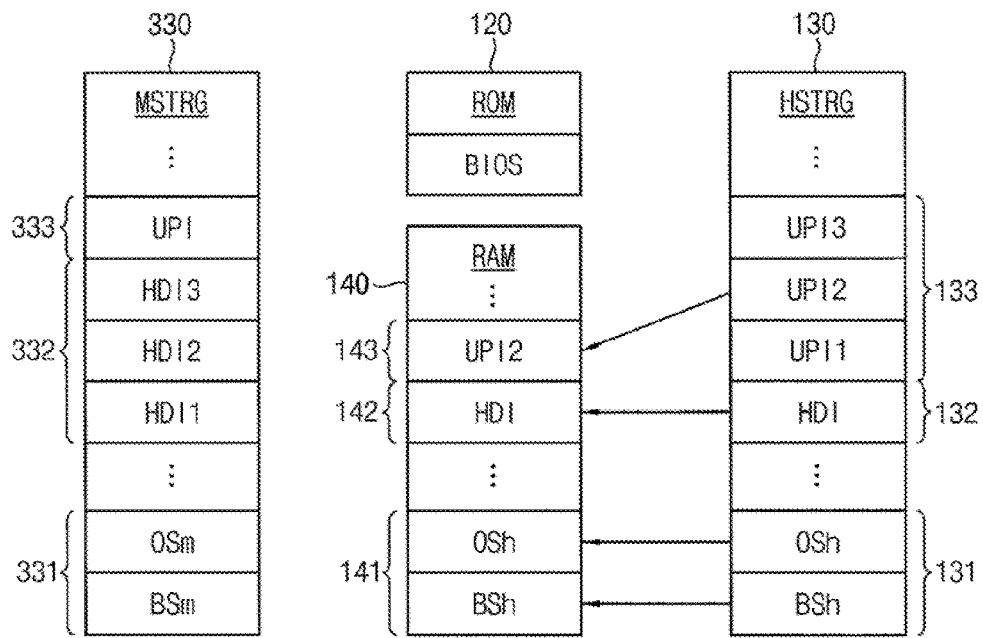
FIGS. 7A and 7B are diagrams illustrating a method of booting a host device according to an exemplary embodiment of the present invention.
Figure 7B:
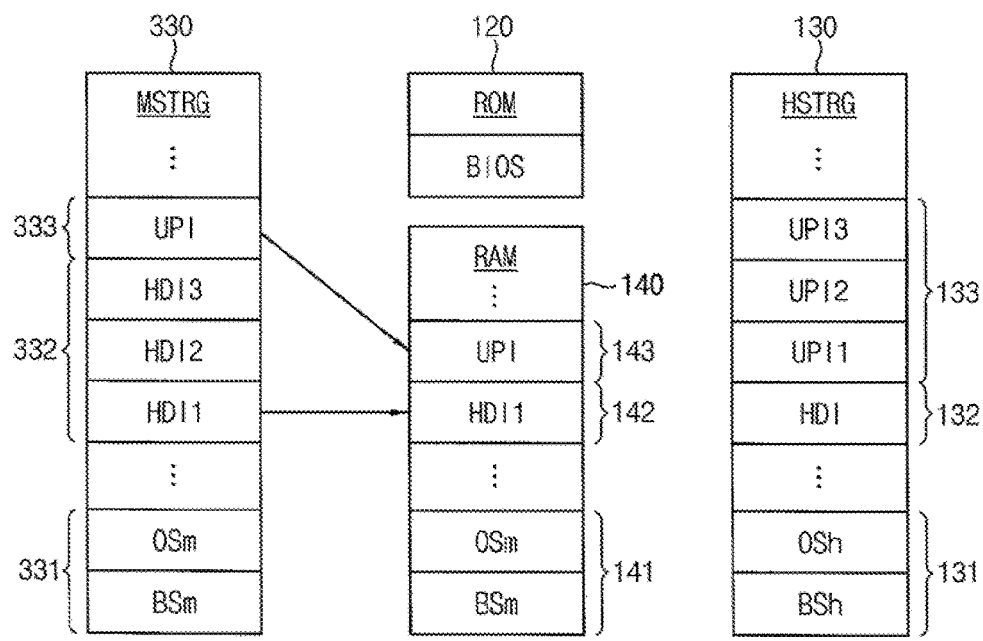

FIGS. 7A and 7B are diagrams illustrating a method of booting a host device according to an exemplary embodiment of the present invention.

Storage spaces of the BIOS memory ROM 120, the internal storage HSTRG 130 of the host device 100, the main memory RAM 140 and the internal storage MSTRG 330 of the mobile device 300 are illustrated in FIGS. 7A and 7B. FIG. 7A illustrates the normal boot operation performed when the ready boot is disabled by the above-mentioned BIOS setup, and FIG. 7B illustrates the ready boot when the ready boot is enabled. As illustrated in FIGS. 7A and 7B, a first boot sector BSh and a first operating system OSh may be stored in a first region 131 of the internal storage 130 of the host device 100, a hardware driver information file HDI according to the host device 100 may be stored in a second region 132 of the internal storage 130 of the host device 100 and a plurality of user profile information files UPI1, UPI2 and UPI3 respectively corresponding to a plurality of users may be stored in a third region 133 of the internal storage 130 of the host device 100. A second boot sector BSm and a second operating system OSm may be stored in a first region 331 of the internal storage 330 of the mobile device 300, a plurality of hardware driver information files HDI1, HDI2 and HDI3 respectively corresponding to a plurality of computer devices may be stored in a second region 332 of the internal storage 330 of the mobile device 300 and a user profile information file UPI may be stored in a third region 333 of the internal storage 330 of the mobile device 300.

Referring to FIG. 7A, the BIOS stored in the BIOS memory 120 may load the first boot sector BSh stored in the internal storage 130 of the host device 100 to a first region 141 of the main memory 140. The processor 100 may load the first operating system OSh stored in the internal storage 130 of the host device 100 to the first region 141 of the main memory 140 based on the loaded first boot sector BSh. In addition, the processor 110 may load the hardware driver information file HDI stored in the internal storage 130 of the host device 100 to a second region 142 of the main memory 140 based on the loaded first operating system OSh. The hardware driver information file HDI may include information on optimized drivers of peripheral devices connected to the host device 100. In addition, the processor 110 may select a user profile information file corresponding to a present user from among a plurality of user profile information files UPI1, UPI2 and UFI3 stored in the internal storage 130 of the host device 100. The selected user profile information file (e.g., UPI2) may be loaded to a third region 143 of the main memory 140 based on the first operating system OSh. The selection of the user profile information file may be performed by a user through an information selection interface that is provided by the first operating system OSh. As such, the normal boot operation may be performed such that the first operating system OSh stored in the internal storage 130 of the host device 100 may be loaded to the main memory 140 of the host device 100.

Referring to FIG. 7B, the BIOS stored in the BIOS memory 120 may load the second boot sector BSm stored in the internal storage 330 of the mobile device 300 to the first region 141 of the main memory 140. The processor 100 may load the second operating system OSm stored in the internal storage 330 of the mobile device 300 to the first region 141 of the main memory 140 based on the loaded second boot sector BSm. In addition, the processor 110 may select a hardware driver information file corresponding to the host device 100 from among a plurality of hardware driver information files HDI1, HDI2 and HDI2 stored in the internal storage 330 of the mobile device 300. The selected hardware driver information file (e.g., HDI1) may be loaded to the second region 142 of the main memory 140 based on the second operating system OSm. The selected hardware driver information file HDI1 may include information on optimized drivers of peripheral devices connected to the host device 100. As will be described below with reference to FIG. 8, the selection of the hardware driver information file may be performed by a user through an information selection interface that is provided by the second operating system OSm. In addition, the processor 110 may load the user profile information file UPI stored in the internal storage 330 of the mobile device 300 to the third region 143 of the main memory 140 based on the loaded second operating system OSm. As such, the ready boot may be performed such that the second operating system OSm stored in the internal storage 330 of the mobile device 300 may be loaded to the main memory 140 of the host device 100.

FIG. 8 is a diagram illustrating an information selection interface according to an exemplary embodiment of the present invention.

FIG. 8 illustrates an example of an information selection interface that is provided by the second operating system OSm. For example, the second operating system OSm may provide a user interface menu 64 as illustrated in FIG. 8 by scanning the hardware driver information files HDI1, HDI2 and HDI3 stored in the internal storage 330 of the mobile device 300 during the booting process.

FIG. 8 illustrates an example of the user interface menu 64 for selecting the hardware driver information file corresponding to the host device 100 among the hardware driver information files HDI1, HDI2 and HDI3. A selection window 84 is provided by the second operating system OSm and the user may select the hardware driver information file through the selection window 84. According to the selection of the user, the selected hardware driver information file may be stored in the main memory 140 and the second operating system OSm may establish the drivers of the peripheral devices connected to the host device 100 based on the selected hardware driver information file stored in the main memory 140.

Figure 9:
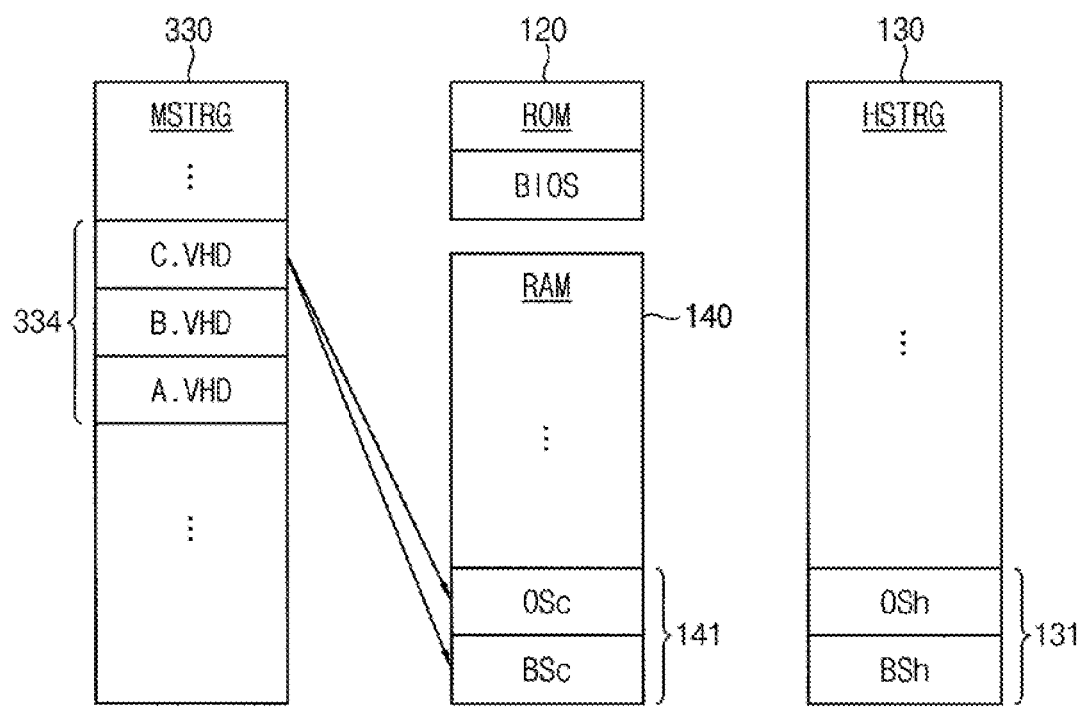
FIG. 9 is a diagram illustrating a method of booting a host device according to an exemplary embodiment of the present invention.

FIG. 9 is a diagram illustrating a method of booting a host device according to an exemplary embodiment.

FIG. 9 is a diagram illustrating how the ready boot is performed when the ready boot is enabled by the above-mentioned BIOS setup. Storage spaces of the BIOS memory ROM 120, the internal storage HSTRG 130 of the host device 100, the main memory RAM 140 and the internal storage MSTRG 330 of the mobile device 300 are illustrated in FIG. 9. As illustrated in FIG. 9, a first boot sector BSh and a first operating system OSh may be stored in a first region 131 of the internal storage 130 of the host device 100 and a plurality of virtual hard disk files A.VHD, B.VHD and C.VHD may be stored in a corresponding region 334 of the internal storage 330 of the mobile device 300. The virtual hard disk VHD may be a file format representing a virtual hard disk drive. The virtual hard disk may include disk partitions and a file system, just as a physical hard disk drive would include.

Referring to FIG. 9, the processor 110 may determine a selected virtual hard disk file corresponding to the host device 100 based on the BIOS stored in the BIOS memory 120 from among a plurality of virtual hard disk files A.VHD, B.VHD and C.VHD stored in the internal storage 330 of the mobile device 300. As will be described below with reference to FIG. 10, the selection of the virtual hard disk file may be performed by a user through an information selection interface that is provided by the BIOS. The processor 110 may load the second boot sector BSm to a first region 141 of the main memory 140 based on the BIOS and the selected virtual hard disk file (e.g., C.VHD). The processor 110 may load the second operating system OSm stored in the internal storage 330 of the mobile device 300 to the first region 141 of the main memory 140 based on the loaded second boot sector BSm. As such, the ready boot may be performed such that the second operating system OSm stored in the internal storage 330 of the mobile device 300 may be loaded to the main memory 140 of the host device 100 based on the selected virtual hard disk file C.VHD stored in the internal storage 330 of the mobile device 300.

FIG. 10 is a diagram illustrating a file selection interface according to an exemplary embodiment of the present invention.

FIG. 10 illustrates an example of a file selection interface that may be provided by the BIOS. The BIOS may provide a user interface menu 65 as illustrated in FIG. 10 by scanning the virtual hard disk files stored in the internal storage 330 of the mobile device 300 during the booting process.

FIG. 10 illustrates an example of the user interface menu 64 for selecting the virtual hard disk file corresponding to the host device 100 among the virtual hard disk files A.VHD, B.VHD and C.VHD stored in the internal storage 330 of the mobile device 300. A selection window 85 is provided by the BIOS and the user may select the virtual hard disk file through the selection window 85. According to the selection of the user, the BIOS may load the second operating system OSm to the main memory 140 of the host device 100.

Figure 11A:
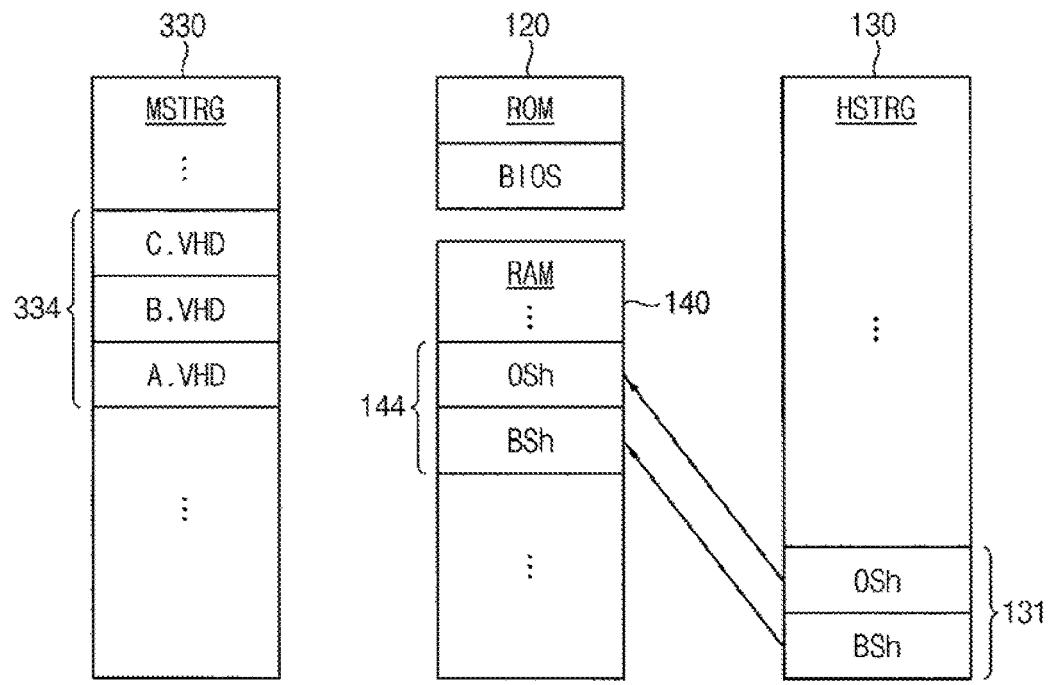
FIGS. 11A, 11B and 11C are diagrams illustrating a method of booting a host device from a mobile device according to an exemplary embodiment of the present invention.
Figure 11B:
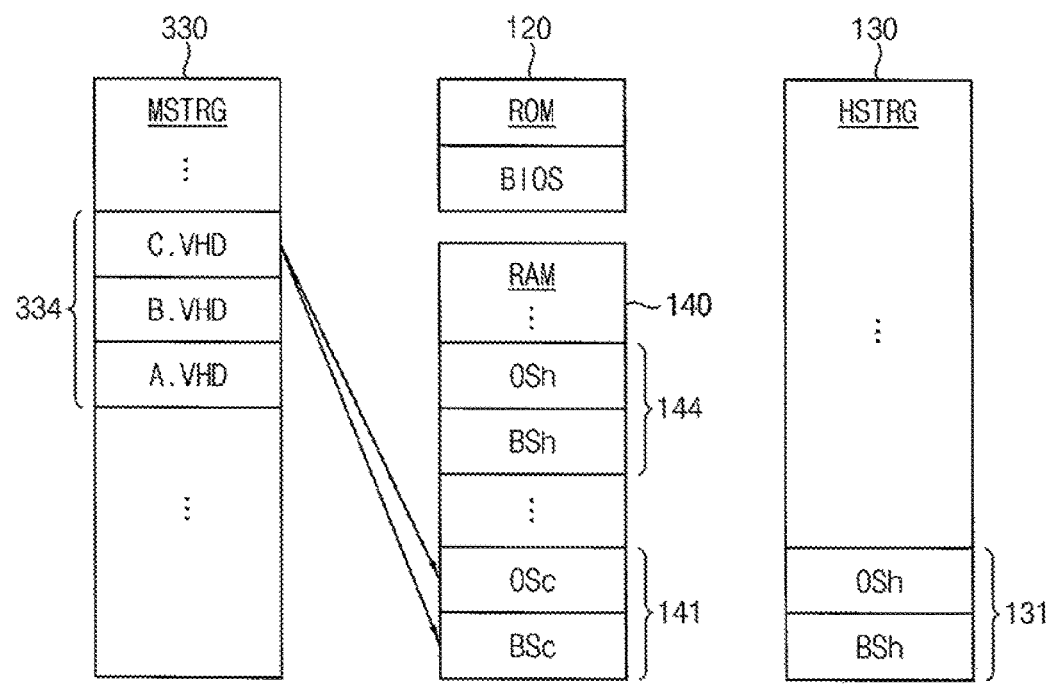
Figure 11C:
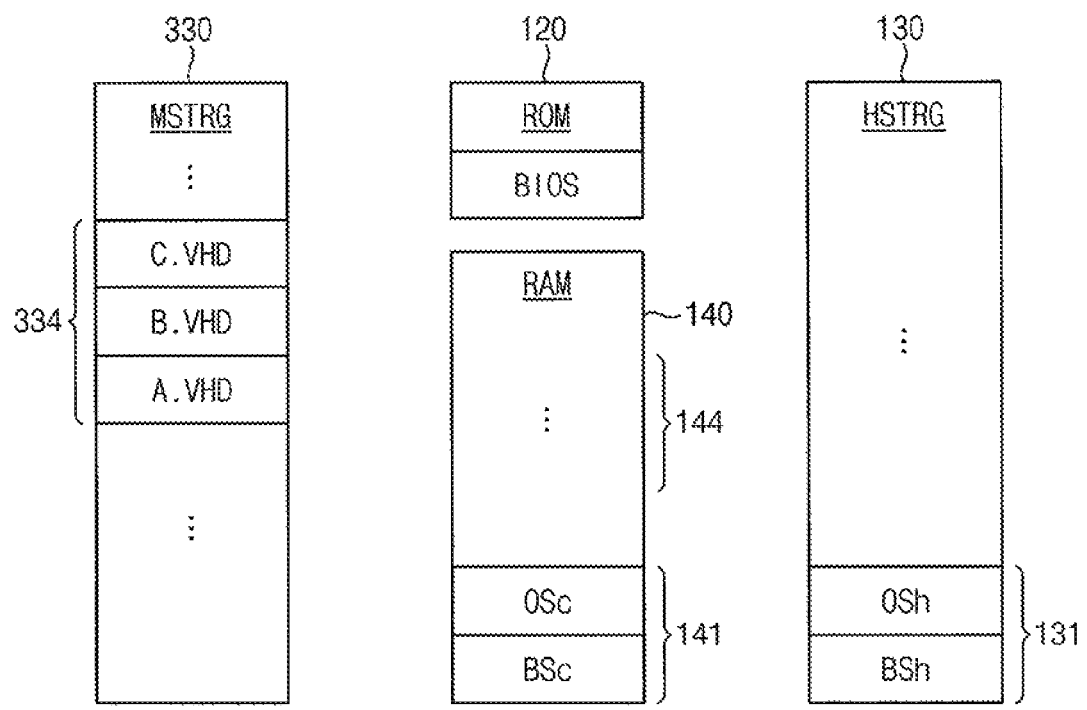

FIGS. 11A, 11B and 11C are diagrams illustrating a method of booting a host device from a mobile device according to an exemplary embodiment of the present invention.

Storage spaces of the BIOS memory ROM 120, the internal storage HSTRG 130 of the host device 100, the main memory RAM 140 and the internal storage MSTRG 330 of the mobile device 300 are illustrated in FIGS. 11A, 11B and 11C. FIGS. 11A, 11B and 11C illustrate an approach for performing the ready boot when the ready boot is enabled by the above-mentioned BIOS setup. As illustrated in FIGS. 11A, 11B and 11C, a first boot sector BSh and a first operating system OSh may be stored in a first region 131 of the internal storage 130 of the host device 100 and a plurality of virtual hard disk files A.VHD, B.VHD and C.VHD may be stored in a corresponding region 334 of the internal storage 330 of the mobile device 300.

Referring to FIG. 11A, the BIOS stored in the BIOS memory 120 may load the first boot sector BSh stored in the internal storage 130 of the host device 100 to a region 144 of the main memory 140. The processor 100 may temporarily load the first operating system OSh stored in the internal storage 130 of the host device 100 to the region 144 of the main memory 140 based on the loaded first boot sector BSh.

Referring to FIG. 11B, the processor 110 may select a virtual hard disk file corresponding to the host device 100 based on the first operating system OSh temporarily loaded in the main memory 140 among a plurality of virtual hard disk files A.VHD, B.VHD and C.VHD stored in the internal storage 330 of the mobile device 300. The selection of the virtual hard disk file may be performed by the user through the information selection interface as illustrated in FIG. 10 that is provided by the first operating system OSh. The processor 110 may load the second boot sector BSm to a first region 141 of the main memory 140 based on the temporarily-loaded first operating system OSh and the selected virtual hard disk file (e.g., C.VHD). The processor 110 may load the second operating system OSm stored in the internal storage 330 of the mobile device 300 to the first region 141 of the main memory 140 based on the loaded second boot sector BSm. As such, the ready boot may be performed such that the second operating system OSm stored in the internal storage 330 of the mobile device 300 may be loaded to the main memory 140 of the host device 100 based on the selected virtual hard disk file C.VHD stored in the internal storage 330 of the mobile device 300.

Referring to FIG. 11C, the region of the main memory 140 to which the first operating system OSh had been loaded temporarily may be cleared or initialized after the second operating system OSm is loaded to the main memory 140. Even though the second operating system OSm is loaded to the main memory 140 using, or based on, the first operating system OSh, the second operating system OSm may operate independently after loading is completed, without using the first operating system OSh.

As shown in FIG. 9, the selection of the selected virtual hard disk file and loading of the second operating system OSc may be performed based on the BIOS. Alternatively, the selection of the selected virtual hard disk file and loading of the second operating system OSc may be performed based on the first operating system OSh as shown in FIGS. 11A, 11B and 11C. In the former case, program codes for analyzing the file system are included in the internal storage 330 of the mobile device 300. Alternatively, the analysis of the file system may be performed by the first operating system OSh in the latter case.

Figure 12:
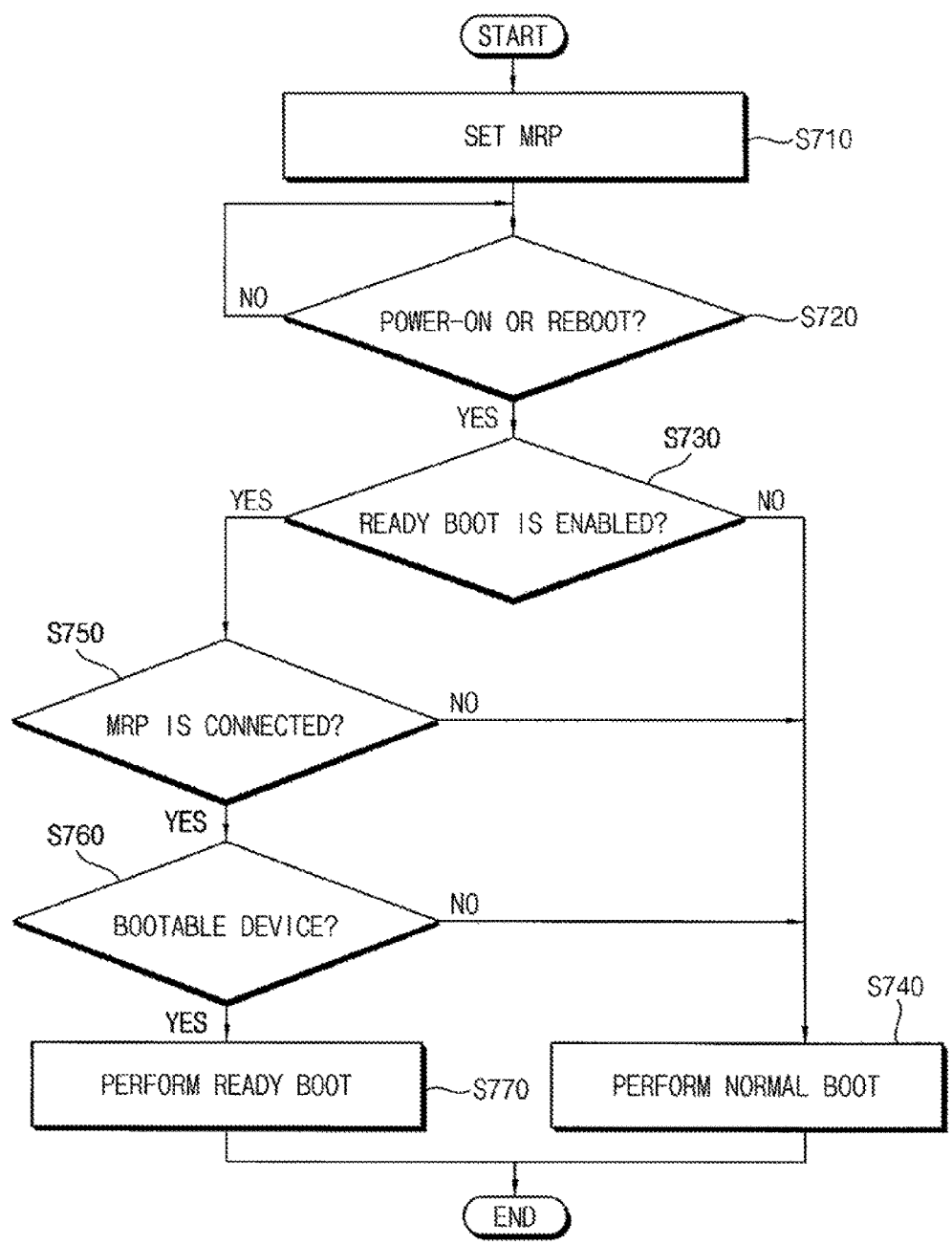
FIG. 12 is a flow chart illustrating a method of booting a host device from a mobile device according to an exemplary embodiment of the present invention.

FIG. 12 is a flow chart illustrating a method of booting a host device from a mobile device according to an exemplary embodiment of the present invention.

Referring to FIGS. 3 and 12, at first, the master ready boot port MASTER READY PORT may be set (S710). For example, the master ready boot port MRP may be set by the user through the BIOS setup interface that is provided by the BIOS as described with reference to FIG. 4C. When the host device 100 is powered on or rebooted (S720: YES), the processor 110 may determine whether the ready boot is enabled (S730), for example, by referring to the boot device sequence of the BIOS. When the ready boot is disabled (S730: NO), the processor 110 may perform the normal boot operation (S740) based on the BIOS. The performance of the normal boot operation may be the same as described with reference to FIGS. 6B and 7B. When the ready boot is enabled (S730: YES), the processor 110 may determine whether a mobile device is connected to the master ready boot port MRP (S750) and determine whether the connected mobile device is a bootable device (S760).

When the mobile device is connected to the master ready boot port MRP (S750: YES) and when the connected device is the bootable device (S760: YES), the processor 110 may perform the ready boot based on the BIOS. The performance of the ready boot is the same as described with reference to FIGS. 6A, 7A, 9, 11A, 11B and 11C. When the mobile device is not connected to the master ready boot port MRP (S750: NO) or when the connected device is not the bootable device (S760: NO), the processor 110 may perform the normal boot operation based on the BIOS.

Figure 13:
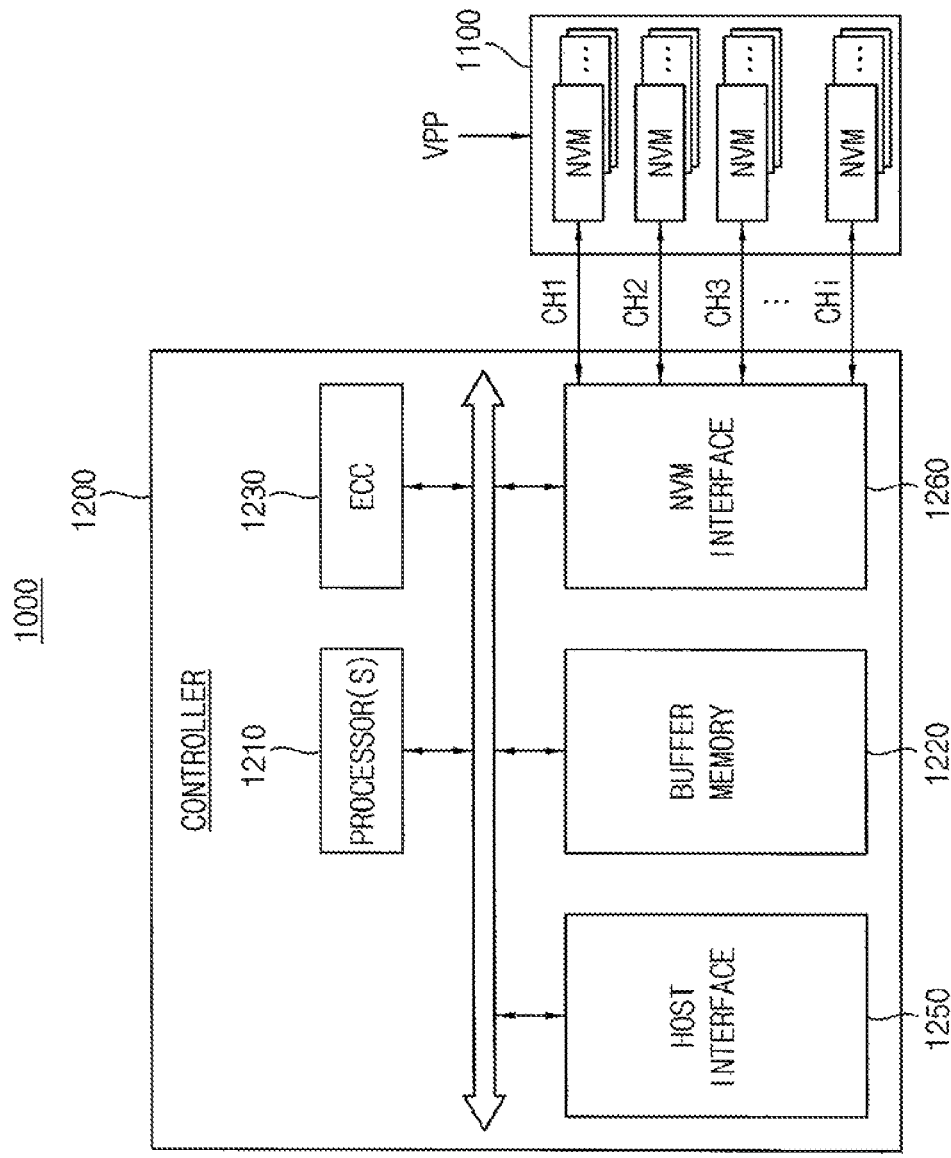
FIG. 13 is a block diagram illustrating a solid state disk or solid state drive (SSD) for booting a host device according to exemplary embodiments of the present invention.

FIG. 13 is a block diagram illustrating a solid state disk or solid state drive (SSD) for booting a host device according to exemplary embodiments of the present invention.

Referring to FIG. 13, an SSD 1000 includes multiple nonvolatile memory devices 1100 and an SSD controller 1200.

The nonvolatile memory devices 1100 may be optionally supplied with an external high voltage VPP for powering the nonvolatile memory device 1100. The nonvolatile memory devices 1100 may store the above-mentioned second operating system. In addition, the nonvolatile memory devices 1100 may store the user profile information and the hardware driver information. The ready boot, as described above, may be performed using the nonvolatile memory devices 1100 that stores the second operating system.

The SSD controller 1200 is connected to the nonvolatile memory devices 1100 through multiple channels CH1 to CHi. The SSD controller 1200 comprises one or more processors 1210, a buffer memory 1220, an ECC block 1230, a host interface 1250, and a nonvolatile memory interface 1260.

The buffer memory 1220 stores data used to drive the SSD controller 1200. The buffer memory 1220 comprises multiple memory lines each storing data or a command. Although FIG. 13 illustrates an exemplary embodiment where the buffer memory 1220 is included in the SSD controller 1200, the inventive concept is not limited thereto. For example, the buffer memory 1220 may be placed outside the SSD controller 1200.

The FCC block 1230 calculates error correction code (ECC) values of data to be programmed at a writing operation and corrects an error of read data using an error correction code value at a read operation. In a data recovery operation, The ECC block 1230 corrects an error of data recovered from the nonvolatile memory devices 1100. Although not shown in FIG. 13, a code memory may further be included in the SSD controller 1200 to store code data needed to drive the SSD controller 1200. The code memory may be implemented by a nonvolatile memory device.

The host interface 1250 interfaces the host with an external device. The nonvolatile memory (NVM) interface 1260 interfaces the host with the nonvolatile memory devices 1100.

Figure 14:
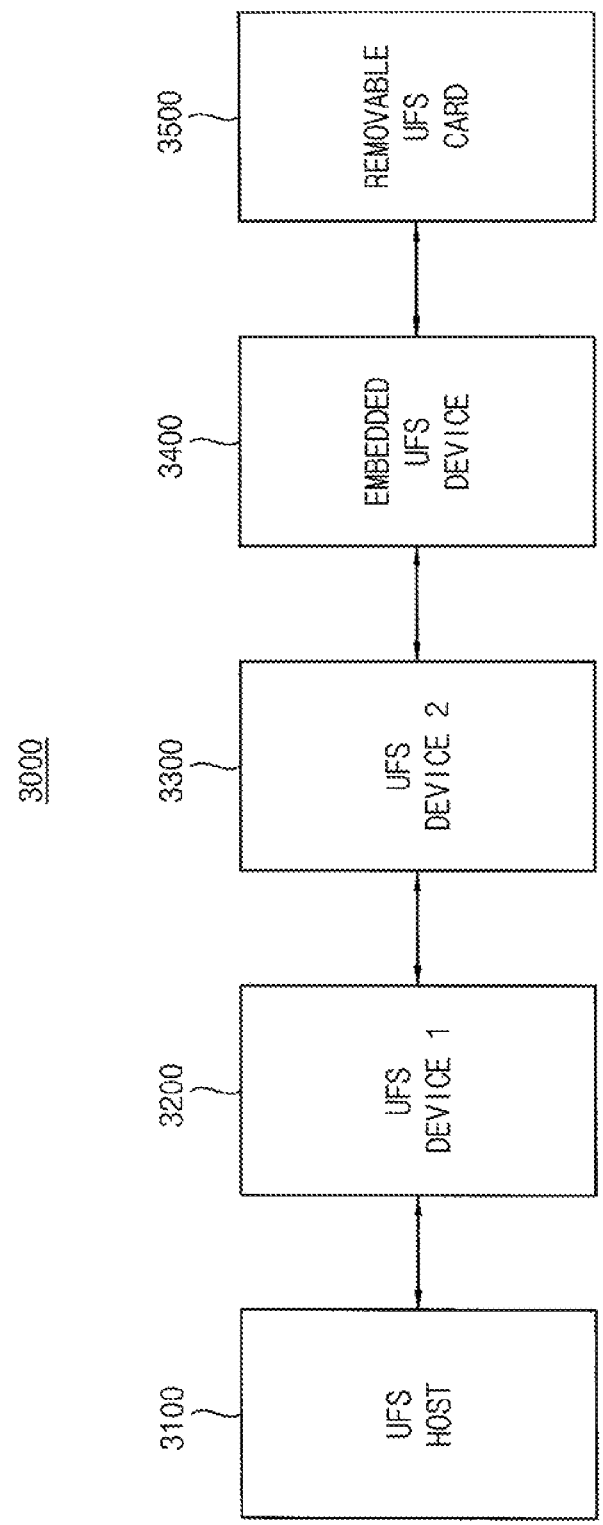
FIG. 14 is a block diagram illustrating a universal flash storage (UFS) according to exemplary embodiments of the present invention.

FIG. 14 is a block diagram illustrating a universal flash storage (UFS) according to exemplary embodiments of the present invention.

Referring to FIG. 14, a UFS system 3000 may include a UFS host 3100, UFS devices 3200 and 3300, an embedded UFS device 3400, and a removable UFS card 3500. The UFS host 3100 may be an application processor of a mobile device. Each of the UFS host 3100, the UFS devices 3200 and 3300, the embedded UFS device 3400 and the removable UFS card 3500 communicate with external devices through the UFS protocol. At least one of the UFS devices 3200 and 3300, the embedded UFS device 3400, and the removable UFS card 3500 is implemented by a nonvolatile memory device. The removable UFS card 3500 may store the above-mentioned second operating system. In addition, the removable UFS card 3500 may store the user profile information and the hardware driver information. The ready boot operation, as described above, may be performed using the removable UFS card 3500 that stores the second operating system.

The embedded UFS device 3400 and the removable UFS card 3500 may perform communications using protocols different from the UFS protocol. The UFS host 3100 and the removable UFS card 3500 may communicate through various card protocols (e.g., UFDs, MMC, SD (secure digital), mini SD, Micro SD, etc.).

A mobile device or a storage device according to exemplary embodiments of the present invention may be packaged using various package types or package configurations, such as Package on Package (PoP), Bali grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like.

Figure 15:
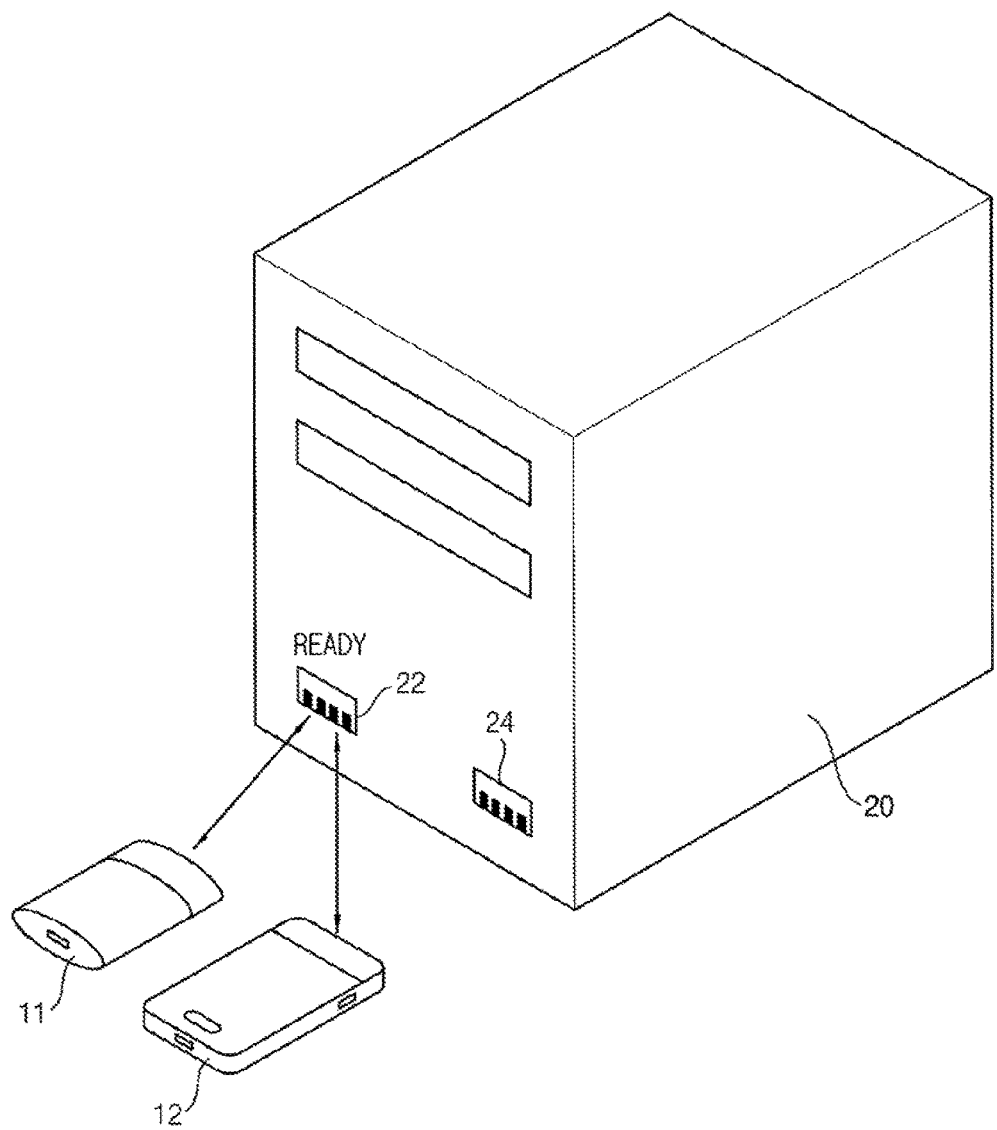
FIGS. 15 and 16 are diagrams illustrating computer systems for being booted from a mobile device according to exemplary embodiments of the present invention.
Figure 16:
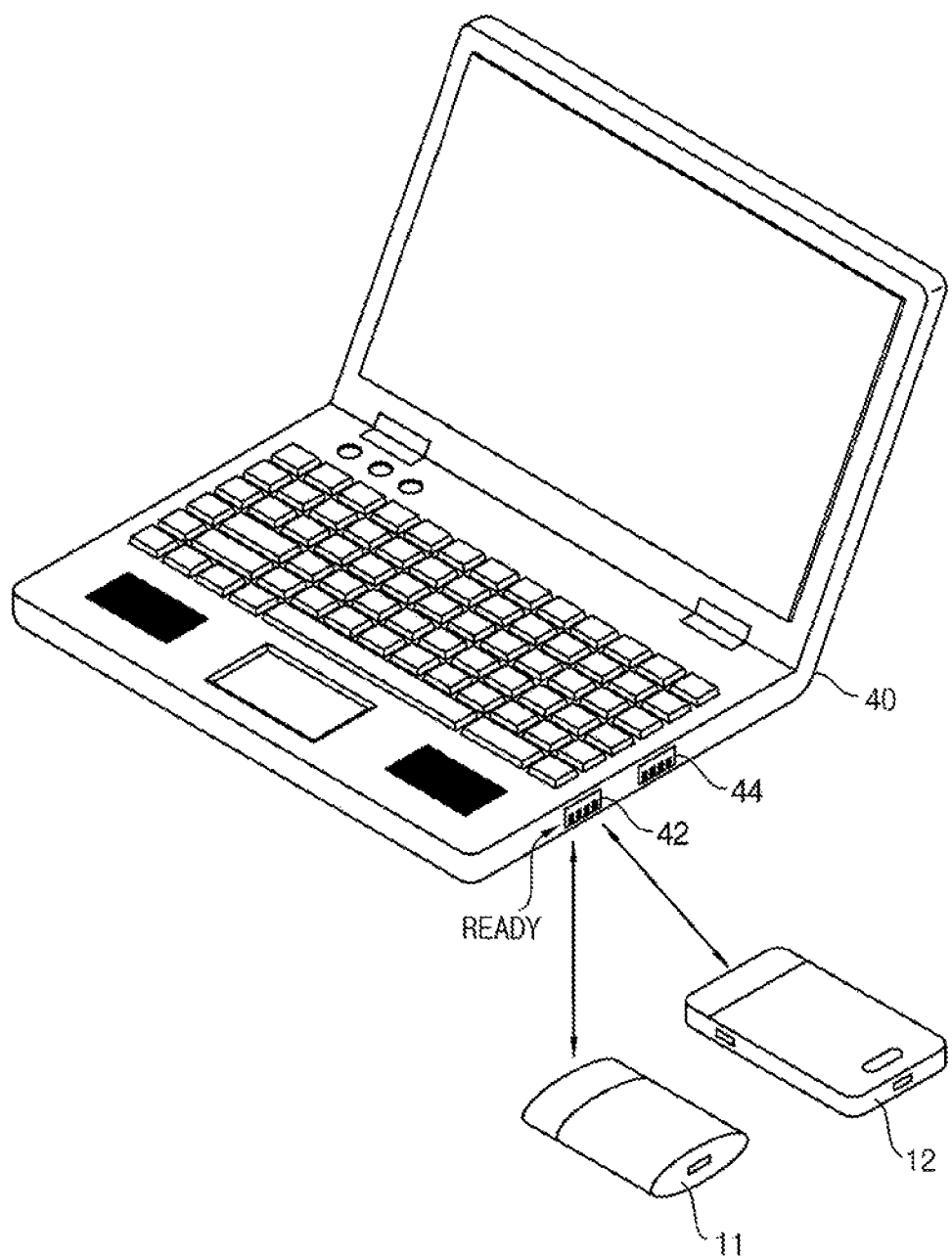

FIGS. 15 and 16 are diagrams illustrating computer systems according to exemplary embodiments of the present invention.

Referring to FIG. 15, mobile devices such as an external SSD device 11, a smartphone 12, etc. may be connected to a desktop computer 20. A first operating system may be stored in the desktop computer 20 and a second operating system may be stored in the mobile devices 11 and 12. One of USB ports 22 and 24 of the desktop computer 20 may be designated as a master ready boot port 22 for performing the ready boot and one of the mobile devices 11 and 12 may be connected to the master ready boot port 22 to perform the ready boot as described above.

Referring to FIG. 16, mobile devices such as an SSD device 11, a smartphone 12, etc. may be connected to a laptop computer or a notebook computer 40. A first operating system may be stored in the notebook computer 40 and a second operating system may be stored in the mobile devices 11 and 12. One of USB ports 42 and 44 of the notebook computer 40 may be designated as a master ready boot port 42 for performing the ready boot and one of the mobile devices 11 and 12 may be connected to the master ready boot port 42 to perform the ready boot as described above.

As described above, the method and the system of booting the host device according to exemplary embodiments of the present invention may be used to efficiently provide an individualized user environment, on the computer system/host device, that is specific to the user using the mobile device. In addition, the method and the system of booting the host device according to exemplary embodiments of the present invention may be used to conveniently provide an individualized user environment to a user even when the user has limited technical skill, because the user need only connect their mobile device to the master ready boot port of the host device/computer system.

The present disclosure may be applied to various devices and systems. For example, the present disclosure may be applied to systems such as a mobile phone, a smart phone, a personal digital assistant (PDA), a portable multimedia player (PMP), a digital camera, a camcorder, personal computer (PC), a server computer, a workstation, a laptop/ notebook computer, a digital TV, a TV set-top box, a portable game console, a navigation system or automobile infotainment system, etc.

The foregoing is illustrative of exemplary embodiments of the present invention. Although a few exemplary embodiments of the present invention have been described, those skilled in the art will readily appreciate that many modifications are possible without materially departing from the novel teachings and aspects of the present disclosure. Accordingly, all such modifications are intended to be included within the scope of the present disclosure.

What is claimed is:

1. A method of booting a host device, comprising:
    enabling or disabling a ready boot option within a basic input-output system (BIOS) of a host device;
    performing a normal boot to load a first operating system (OS), that is stored in an internal storage of the host device, to a main memory of the host device when the ready boot option is disabled; and
    performing a boot operation to load a second OS, that is stored as a virtual hard disk file in an internal storage of a mobile communications device, to the main memory of the host device when the ready boot option is enabled,
    wherein performing the boot operation to load the second OS to the main memory of the host device includes selecting a hardware driver information file corresponding to the host device from among a plurality of hardware driver information files stored in the internal storage of the mobile communications device, and loading the selected hardware driver information file stored in the internal storage of the mobile communications device to the main memory of the host device on the instructions of the second OS.

2. The method of claim 1, wherein a user performs the enabling or disabling of the ready boot option through a BIOS setup interface menu that is provided by the BIOS.

3. The method of claim 1, further comprising: designating one of a plurality of connection ports of the host device as a master ready port and performing the boot operation to the second OS via a connection between the designated master ready port of the host device and the mobile communications device.

4. The method of claim 3, wherein the master ready port is designated by a user through a BIOS setup interface menu that is provided by the BIOS.

5. The method of claim 3, further comprising: using a detector connected to the master ready port to determine whether the mobile communications device is connected to the master ready port, and generating the flag signal indicating whether the mobile communications device is connected to the master ready port.

6. The method of claim 5, further comprising: determining whether to perform the boot operation to load the second OS from the internal storage of the mobile communications device based on the flag signal.

7. The method of claim 1, wherein performing the boot operation to load the second OS from the internal storage of the mobile communications device includes:
    loading a boot sector stored in the internal storage of the mobile communications device to the main memory of the host device; and
    loading the second OS stored in the internal storage of the mobile communications device to the main memory of the host device based on the loaded boot sector.

8. The method of claim 1, wherein the selected hardware driver information file is selected by a user through an information selection interface menu that is provided by the second OS.

9. The method of claim 1, wherein performing the boot operation to load the second OS from the internal storage of the mobile communications device includes:
    selecting the virtual hard disk file corresponding to the host device from among a plurality of virtual hard disk files stored in the internal storage of the mobile communications device; and
    loading the second OS stored in the internal storage of the mobile communications device to the main memory of the host device based on the selected virtual hard disk file.

10. The method of claim 9, wherein the selected virtual hard disk file is determined by a user through a file selection interface menu that is provided by the BIOS.

11. The method of claim 1, wherein selecting the virtual hard disk file of the internal storage of the mobile communications device includes:
    selecting the virtual hard disk file corresponding to the host device from among a plurality of virtual hard disk files stored in the internal storage of the mobile communications device; and
    loading the second OS stored in the internal storage of the mobile communications device to the main memory of the host device based on the selected virtual hard disk file.

12. The method of claim 1, wherein the mobile communications device is connected to the host device through a universal serial bus (USB) port of the host device.

13. The method of claim 1, wherein the virtual hard disk file of the internal storage of the mobile communications device is selected for booting by a temporary booting of the first OS on the host device.

14. A method for booting a computer system, comprising:
    temporarily loading a first operating system stored in an internal storage of the computer system to a main memory of the computer system;
    receiving an instruction to enable a ready boot option;
    scanning a designated ready boot port from among a plurality of USB ports of the computer system to determine if a mobile communications device is connected to the designated ready boot port;
    identifying a plurality of hard disk images stored within the mobile communications device via the designated ready boot port, using the first operating system;
    displaying a menu for a selection between each of the identified plurality of hard disk images, using the first operating system;
    receiving a selection from the identified plurality of hard disk images from a user, using the first operating system; and
    loading a second operating system from the selected hard disk image stored within the mobile communications device to the main memory of the computer system,
    wherein loading the second operating system to the main memory of the computer system includes selecting a hardware driver information file corresponding to the computer system from among a plurality of hardware driver information files stored in the mobile communications device, and loading the selected hardware driver information file stored in the mobile communications device to the main memory of the computer system on the instructions of the second operating system.

15. The method of claim 14, wherein the instruction to enable the ready boot option is received from a basic input-output system (BIOS) of the computer system.

16. The method of claim 14, wherein the mobile communications device is a smartphone.

17. The method of claim 14, further comprising:
receiving an instruction to disable the ready boot option, using the second operating system; and
loading the first operating system from the internal storage device of the computer system to the main memory of the computer system.

18. The method of claim 14, further comprising:
receiving a second selection from the identified plurality of hard disk images from the user; and
loading a third operating system from the second selected hard disk image to the main memory of the computer system.

19. A method of booting a host device, comprising:
enabling or disabling a ready boot option within a basic input-output system (BIOS) of a host device;
performing a normal boot to load a first operating system (OS), that is stored in an internal storage of the host device, to a main memory of the host device when the ready boot option is disabled; and
performing a boot operation to load a second OS, that is stored as a virtual hard disk file in an internal storage of a mobile communications device, to the main memory of the host device when the ready boot option is enabled,
wherein performing the boot operation to load the second OS from the internal storage of the mobile communications device includes:
loading a boot sector stored in the internal storage of the mobile communications device to the main memory of the host device; and
loading the second OS stored in the internal storage of the mobile communications device to the main memory of the host device based on the loaded boot sector, and
wherein performing the boot operation to load the second OS from the internal storage of the mobile communications device further includes: loading a user profile information file stored in the internal storage of the mobile communications device to the main memory of the host device on the instructions of the second OS.

20. The method of claim 19, wherein performing the boot operation to load the second OS from the internal storage of the mobile communications device further includes:
selecting a hardware driver information file corresponding to the host device from among a plurality of hardware driver information files stored in the internal storage of the mobile communications device; and
loading the selected hardware driver information file stored in the internal storage of the mobile communications device to the main memory of the host device on the instructions of the second OS.

* * * * *